(12) United States Patent
Kadambi et al.

(10) Patent No.: US 11,270,110 B2
(45) Date of Patent: Mar. 8, 2022

(54) SYSTEMS AND METHODS FOR SURFACE MODELING USING POLARIZATION CUES

(71) Applicant: BOSTON POLARIMETRICS, INC., Palo Alto, CA (US)

(72) Inventors: Achuta Kadambi, Los Altos Hills, CA (US); Agastya Kalra, Nepean (CA); Supreeth Krishna Rao, San Jose, CA (US); Kartik Venkataraman, San Jose, CA (US)

(73) Assignee: BOSTON POLARIMETRICS, INC., Palo Alto, CA (US)

( * ) Notice: Subject to any disclaimer, the term of this patent is extended or adjusted under 35 U.S.C. 154(b) by 0 days.

(21) Appl. No.: 17/266,054

(22) PCT Filed: Sep. 17, 2020

(86) PCT No.: PCT/US2020/051243
§ 371 (c)(1),
(2) Date: Feb. 4, 2021

(87) PCT Pub. No.: WO2021/055585
PCT Pub. Date: Mar. 25, 2021

(65) Prior Publication Data
US 2021/0264147 A1    Aug. 26, 2021

Related U.S. Application Data

(60) Provisional application No. 63/001,445, filed on Mar. 29, 2020, provisional application No. 62/901,731, filed on Sep. 17, 2019.

(51) Int. Cl.
G06K 9/00      (2006.01)
G06K 9/20      (2006.01)
(Continued)

(52) U.S. Cl.
CPC ....... *G06K 9/00577* (2013.01); *G06K 9/2036* (2013.01); *G06K 9/4661* (2013.01); *G06K 9/627* (2013.01); *G06K 2209/19* (2013.01)

(58) Field of Classification Search
CPC ............ G06K 9/00577; G06K 9/2036; G06K 9/4661; G06K 9/627
See application file for complete search history.

(56) References Cited

U.S. PATENT DOCUMENTS 4,124,798 A    11/1978 Thompson
4,198,646 A     4/1980 Alexander et al.
(Continued)

FOREIGN PATENT DOCUMENTS

CN    2488005 Y    4/2002
CN    1619358 A    5/2005
(Continued)

OTHER PUBLICATIONS

Atkinson et al., "Hight-sensitivity analysis of polarization by surface Reflection," In: Machine Vision and Applications, Aug. 3, 2018, Retrieved on Oct. 26, 2020 from https://link.springer.com/content/pdf/10.1007/s00138-018-0962-7.pdf, 19 pages.
(Continued)

*Primary Examiner* — Md K Talukder
(74) *Attorney, Agent, or Firm* — Lewis Roca Rothgerber Christie LLP

(57) ABSTRACT

A computer-implemented method for surface modeling includes: receiving one or more polarization raw frames of a surface of a physical object, the polarization raw frames being captured with a polarizing filter at different linear polarization angles; extracting one or more first tensors in one or more polarization representation spaces from the polarization raw frames; and detecting a surface characteristic of the surface of the physical object based on the one
(Continued)

or more first tensors in the one or more polarization representation spaces.

24 Claims, 12 Drawing Sheets

(51) Int. Cl.
 *G06K 9/46* (2006.01)
 *G06K 9/62* (2022.01)

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,475,422 A | 12/1995 | Suzuki et al. |
| 5,488,674 A | 1/1996 | Burt et al. |
| 5,517,236 A | 5/1996 | Sergeant et al. |
| 5,629,524 A | 5/1997 | Stettner et al. |
| 5,638,461 A | 6/1997 | Fridge |
| 5,675,377 A | 10/1997 | Gibas et al. |
| 5,703,961 A | 12/1997 | Rogina et al. |
| 5,710,875 A | 1/1998 | Hsu et al. |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,867,584 A | 2/1999 | Hu et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,084,979 A | 7/2000 | Kanade et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,185,529 B1 | 2/2001 | Chen et al. |
| 6,198,852 B1 | 3/2001 | Anandan et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,546,153 B1 | 4/2003 | Hoydal |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,488 B1 | 6/2004 | Driescher et al. |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,013,318 B2 | 3/2006 | Rosengard et al. |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen et al. |
| 7,430,312 B2 | 9/2008 | Gu |
| 7,471,765 B2 | 12/2008 | Jaffray et al. |
| 7,496,293 B2 | 2/2009 | Shamir et al. |
| 7,564,019 B2 | 7/2009 | Olsen et al. |
| 7,599,547 B2 | 10/2009 | Sun et al. |
| 7,606,484 B1 | 10/2009 | Richards et al. |
| 7,620,265 B1 | 11/2009 | Wolff et al. |
| 7,633,511 B2 | 12/2009 | Shum et al. |
| 7,639,435 B2 | 12/2009 | Chiang |
| 7,639,838 B2 | 12/2009 | Nims |
| 7,646,549 B2 | 1/2010 | Zalevsky et al. |
| 7,657,090 B2 | 2/2010 | Omatsu et al. |
| 7,667,824 B1 | 2/2010 | Moran |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,924,321 B2 | 4/2011 | Nayar et al. |

(56) References Cited

U.S. PATENT DOCUMENTS

| | | | |
|---|---|---|---|
| 7,956,871 B2 | 6/2011 | Fainstain et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,055,466 B2 | 11/2011 | Bryll |
| 8,077,245 B2 | 12/2011 | Adamo et al. |
| 8,089,515 B2 | 1/2012 | Chebil et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,111,910 B2 | 2/2012 | Tanaka |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev et al. |
| 8,194,296 B2 | 6/2012 | Compton et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,284,240 B2 | 10/2012 | Saint-Pierre et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,294,754 B2 | 10/2012 | Jung et al. |
| 8,300,085 B2 | 10/2012 | Yang et al. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,350,957 B2 | 1/2013 | Schechner et al. |
| 8,360,574 B2 | 1/2013 | Ishak et al. |
| 8,400,555 B1 | 3/2013 | Georgiev et al. |
| 8,406,562 B2 | 3/2013 | Bassi et al. |
| 8,411,146 B2 | 4/2013 | Twede |
| 8,416,282 B2 | 4/2013 | Lablans |
| 8,446,492 B2 | 5/2013 | Nakano et al. |
| 8,456,517 B2 | 6/2013 | Spektor et al. |
| 8,471,895 B2 * | 6/2013 | Banks | G01S 7/486 |
| | | | 348/46 |
| 8,493,496 B2 | 7/2013 | Freedman et al. |
| 8,514,291 B2 | 8/2013 | Chang |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,558,929 B2 | 10/2013 | Tredwell |
| 8,559,705 B2 | 10/2013 | Ng |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,648,919 B2 | 2/2014 | Mantzel et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,754,941 B1 | 6/2014 | Sarwari et al. |
| 8,773,536 B1 | 7/2014 | Zhang |
| 8,780,113 B1 | 7/2014 | Ciurea et al. |
| 8,787,691 B2 | 7/2014 | Takahashi et al. |
| 8,792,710 B2 | 7/2014 | Keselman |
| 8,804,255 B2 | 8/2014 | Duparre |
| 8,823,813 B2 | 9/2014 | Mantzel et al. |
| 8,830,375 B2 | 9/2014 | Ludwig |
| 8,831,367 B2 | 9/2014 | Venkataraman et al. |
| 8,831,377 B2 | 9/2014 | Pitts et al. |
| 8,836,793 B1 | 9/2014 | Kriesel et al. |
| 8,842,201 B2 | 9/2014 | Tajiri |
| 8,854,433 B1 | 10/2014 | Rafii |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Ito et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,030,528 B2 | 5/2015 | Pesach et al. |
| 9,031,335 B2 | 5/2015 | Venkataraman et al. |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,047,684 B2 | 6/2015 | Lelescu et al. |
| 9,049,367 B2 | 6/2015 | Venkataraman et al. |
| 9,055,233 B2 | 6/2015 | Venkataraman et al. |
| 9,060,120 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,100,586 B2 | 8/2015 | McMahon et al. |
| 9,100,635 B2 | 8/2015 | Duparre et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,247,117 B2 | 1/2016 | Jacques |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,426,343 B2 | 8/2016 | Rodda et al. |

(56) References Cited

U.S. PATENT DOCUMENTS

| | | |
|---|---|---|
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,729,865 B1 | 8/2017 | Kuo et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,866,739 B2 | 1/2018 | McMahon |
| 9,888,194 B2 | 2/2018 | Duparre |
| 9,892,522 B2 | 2/2018 | Smirnov et al. |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,942,474 B2 | 4/2018 | Venkataraman et al. |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,218,889 B2 | 2/2019 | McMahan |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,482,618 B2 | 11/2019 | Jain et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,643,383 B2 | 5/2020 | Venkataraman |
| 10,659,751 B1 * | 5/2020 | Briggs ................ G02B 5/3025 |
| 10,674,138 B2 | 6/2020 | Venkataraman et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,742,861 B2 | 8/2020 | McMahon |
| 10,767,981 B2 | 9/2020 | Venkataraman et al. |
| 10,805,589 B2 | 10/2020 | Venkataraman et al. |
| 10,818,026 B2 | 10/2020 | Jain et al. |
| 10,839,485 B2 | 11/2020 | Lelescu et al. |
| 10,909,707 B2 | 2/2021 | Ciurea et al. |
| 10,944,961 B2 | 3/2021 | Ciurea et al. |
| 10,958,892 B2 | 3/2021 | Mullis |
| 10,976,239 B1 | 4/2021 | Hart et al. |
| 10,984,276 B2 | 4/2021 | Venkataraman et al. |
| 11,022,725 B2 | 6/2021 | Duparre et al. |
| 11,024,046 B2 | 6/2021 | Venkataraman |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0003669 A1 | 1/2002 | Kedar et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |

(56) References Cited

U.S. PATENT DOCUMENTS

| | | |
|---|---|---|
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036135 A1 | 2/2005 | Earthman et al. |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0111705 A1 | 5/2005 | Waupotitsch et al. |
| 2005/0117015 A1 | 6/2005 | Cutler |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0203380 A1 | 9/2005 | Sauer et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0153290 A1 | 7/2006 | Watabe et al. |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0215879 A1 | 9/2006 | Whitaker |
| 2006/0215924 A1 | 9/2006 | Steinberg et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |

(56) References Cited

U.S. PATENT DOCUMENTS

| | | |
|---|---|---|
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0291995 A1 | 12/2007 | Rivera |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296846 A1 | 12/2007 | Barman et al. |
| 2007/0296847 A1 | 12/2007 | Chang et al. |
| 2007/0297696 A1 | 12/2007 | Hamza et al. |
| 2008/0006859 A1 | 1/2008 | Mionetto |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0044170 A1 | 2/2008 | Yap et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152213 A1 | 6/2008 | Medioni et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0246866 A1 | 10/2008 | Kinoshita et al. |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0237662 A1 | 9/2009 | Chang et al. |
| 2009/0245573 A1 | 10/2009 | Saptharishi et al. |
| 2009/0245637 A1 | 10/2009 | Barman et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0295933 A1 | 12/2009 | Schechner et al. |
| 2009/0297056 A1 | 12/2009 | Lelescu et al. |
| 2009/0302205 A9 | 12/2009 | Olsen et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097444 A1 | 4/2010 | Lablans |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |

(56) References Cited

U.S. PATENT DOCUMENTS

| | | |
|---|---|---|
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van Hoorebeke et al. |
| 2010/0195716 A1 | 8/2010 | Klein Gunnewiek et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour Tehrani et al. |
| 2010/0259610 A1 | 10/2010 | Petersen |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0296724 A1 | 11/2010 | Chang et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0329528 A1* | 12/2010 | Hajnal ............. G01R 33/56509 382/131 |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0013006 A1 | 1/2011 | Uzenbajakava et al. |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0084893 A1 | 4/2011 | Lee et al. |
| 2011/0085028 A1 | 4/2011 | Samadani et al. |
| 2011/0090217 A1 | 4/2011 | Mashitani et al. |
| 2011/0102553 A1 | 5/2011 | Corcoran et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das Gupta et al. |
| 2011/0255592 A1 | 10/2011 | Sung et al. |
| 2011/0255745 A1 | 10/2011 | Hodder et al. |
| 2011/0255786 A1 | 10/2011 | Hunter et al. |
| 2011/0261993 A1 | 10/2011 | Weiming et al. |
| 2011/0267264 A1 | 11/2011 | Mccarthy et al. |
| 2011/0267348 A1 | 11/2011 | Lin et al. |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain |
| 2012/0013748 A1 | 1/2012 | Stanwood et al. |
| 2012/0014456 A1 | 1/2012 | Martinez Bauza et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062697 A1 | 3/2012 | Treado et al. |

(56) References Cited

U.S. PATENT DOCUMENTS

| | | |
|---|---|---|
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0114260 A1 | 5/2012 | Takahashi et al. |
| 2012/0120264 A1 | 5/2012 | Lee et al. |
| 2012/0127275 A1 | 5/2012 | Von Zitzewitz et al. |
| 2012/0127284 A1 | 5/2012 | Bar-Zeev et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0162374 A1 | 6/2012 | Markas et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0218455 A1 | 8/2012 | Imai et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0307084 A1 | 12/2012 | Mantzel |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0002953 A1 | 1/2013 | Noguchi et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0123985 A1 | 5/2013 | Hirai et al. |
| 2013/0127988 A1 | 5/2013 | Wang et al. |
| 2013/0128049 A1 | 5/2013 | Schofield et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0216144 A1 | 8/2013 | Robinson et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0278631 A1 | 10/2013 | Border et al. |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-ghoroury et al. |
| 2013/0321589 A1 | 12/2013 | Kirk et al. |
| 2013/0335598 A1 | 12/2013 | Gustavsson et al. |
| 2013/0342641 A1 | 12/2013 | Morioka et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125760 A1 | 5/2014 | Au et al. |

(56) References Cited

U.S. PATENT DOCUMENTS

| | | |
|---|---|---|
| 2014/0125771 A1 | 5/2014 | Grossmann et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146201 A1 | 5/2014 | Knight et al. |
| 2014/0176592 A1 | 6/2014 | Wilburn et al. |
| 2014/0183258 A1 | 7/2014 | DiMuro |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0307058 A1 | 10/2014 | Kirk et al. |
| 2014/0307063 A1 | 10/2014 | Lee |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042814 A1 | 2/2015 | Vaziri |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0093015 A1* | 4/2015 | Liang .................. G06K 9/6267 382/154 |
| 2015/0095235 A1 | 4/2015 | Dua |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0206912 A1 | 7/2015 | Kanamori et al. |
| 2015/0207990 A1 | 7/2015 | Ford et al. |
| 2015/0228081 A1 | 8/2015 | Kim et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0256733 A1 | 9/2015 | Kanamori |
| 2015/0264337 A1 | 9/2015 | Venkataraman et al. |
| 2015/0288861 A1 | 10/2015 | Duparre |
| 2015/0296137 A1 | 10/2015 | Duparre et al. |
| 2015/0312455 A1 | 10/2015 | Venkataraman et al. |
| 2015/0317638 A1 | 11/2015 | Donaldson |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2016/0037097 A1 | 2/2016 | Duparre |
| 2016/0042548 A1 | 2/2016 | Du et al. |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0070030 A1 | 3/2016 | Fujisawa et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0182786 A1 | 6/2016 | Anderson et al. |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0209654 A1 | 7/2016 | Riccomini et al. |
| 2016/0210785 A1 | 7/2016 | Balachandreswaran et al. |
| 2016/0216198 A1 | 7/2016 | Sun et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0261844 A1 | 9/2016 | Kadambi et al. |
| 2016/0266284 A1 | 9/2016 | Duparre et al. |
| 2016/0267486 A1 | 9/2016 | Mitra et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0309084 A1 | 10/2016 | Venkataraman et al. |
| 2016/0309134 A1 | 10/2016 | Venkataraman et al. |
| 2016/0316140 A1 | 10/2016 | Nayar et al. |
| 2016/0323578 A1 | 11/2016 | Kaneko et al. |
| 2017/0004791 A1 | 1/2017 | Aubineau et al. |
| 2017/0006233 A1 | 1/2017 | Venkataraman et al. |
| 2017/0011405 A1 | 1/2017 | Pandey |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |

(56) References Cited

U.S. PATENT DOCUMENTS

| | | |
|---|---|---|
| 2017/0070753 A1 | 3/2017 | Kaneko |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0109742 A1 | 4/2017 | Varadarajan |
| 2017/0142405 A1 | 5/2017 | Shors et al. |
| 2017/0163862 A1 | 6/2017 | Molina |
| 2017/0178363 A1 | 6/2017 | Venkataraman et al. |
| 2017/0178399 A1 | 6/2017 | Fest |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0268990 A1 | 9/2017 | Martinello et al. |
| 2017/0337682 A1 | 11/2017 | Liao et al. |
| 2017/0365104 A1 | 12/2017 | McMahon et al. |
| 2018/0005012 A1 | 1/2018 | Aycock et al. |
| 2018/0005244 A1 | 1/2018 | Govindarajan et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0100731 A1* | 4/2018 | Pau .................. H04N 9/04555 |
| 2018/0109782 A1 | 4/2018 | Duparre et al. |
| 2018/0124311 A1 | 5/2018 | Lelescu et al. |
| 2018/0131852 A1 | 5/2018 | McMahon |
| 2018/0139382 A1 | 5/2018 | Venkataraman et al. |
| 2018/0177461 A1 | 6/2018 | Bell et al. |
| 2018/0189767 A1 | 7/2018 | Bigioi |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0286120 A1 | 10/2018 | Fleishman et al. |
| 2018/0302554 A1 | 10/2018 | Lelescu et al. |
| 2018/0330182 A1 | 11/2018 | Venkataraman et al. |
| 2018/0376122 A1 | 12/2018 | Park et al. |
| 2019/0012768 A1 | 1/2019 | Tafazoli Bilandi et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0052792 A1 | 2/2019 | Baba et al. |
| 2019/0057513 A1 | 2/2019 | Jain et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0164341 A1 | 5/2019 | Venkataraman |
| 2019/0174040 A1 | 6/2019 | Mcmahon |
| 2019/0174077 A1 | 6/2019 | Mitani et al. |
| 2019/0197735 A1 | 6/2019 | Xiong et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0243086 A1 | 8/2019 | Rodda et al. |
| 2019/0244379 A1 | 8/2019 | Venkataraman |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0362515 A1 | 11/2019 | Ciurea et al. |
| 2019/0364263 A1 | 11/2019 | Jannard et al. |
| 2020/0012119 A1 | 1/2020 | Pezzaniti et al. |
| 2020/0026948 A1 | 1/2020 | Venkataraman et al. |
| 2020/0034998 A1 | 1/2020 | Schlemper et al. |
| 2020/0151894 A1 | 5/2020 | Jain et al. |
| 2020/0162680 A1 | 5/2020 | Mitani et al. |
| 2020/0195862 A1* | 6/2020 | Briggs .................. G06K 9/00791 |
| 2020/0204729 A1 | 6/2020 | Kurita et al. |
| 2020/0252597 A1 | 8/2020 | Mullis |
| 2020/0311418 A1 | 10/2020 | Mahadeswaraswamy et al. |
| 2020/0334905 A1 | 10/2020 | Venkataraman |
| 2020/0389604 A1 | 12/2020 | Venkataraman et al. |
| 2021/0042952 A1 | 2/2021 | Jain et al. |
| 2021/0044790 A1 | 2/2021 | Venkataraman et al. |
| 2021/0063141 A1 | 3/2021 | Venkataraman et al. |
| 2021/0081698 A1* | 3/2021 | Lindeman .................. G06T 7/70 |
| 2021/0089807 A1 | 3/2021 | Liu et al. |
| 2021/0133927 A1 | 5/2021 | Lelescu et al. |
| 2021/0150748 A1 | 5/2021 | Ciurea et al. |

FOREIGN PATENT DOCUMENTS

| | | |
|---|---|---|
| CN | 1669332 A | 9/2005 |
| CN | 1727991 A | 2/2006 |
| CN | 1839394 A | 9/2006 |
| CN | 1985524 A | 6/2007 |
| CN | 1992499 A | 7/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101551586 A | 10/2009 |
| CN | 101593350 A | 12/2009 |
| CN | 101606086 A | 12/2009 |
| CN | 101785025 A | 7/2010 |
| CN | 101883291 A | 11/2010 |
| CN | 102037717 A | 4/2011 |
| CN | 102164298 A | 8/2011 |
| CN | 102184720 A | 9/2011 |
| CN | 102375199 A | 3/2012 |
| CN | 103004180 A | 3/2013 |
| CN | 103765864 A | 4/2014 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 105409212 A | 3/2016 |
| CN | 103765864 B | 7/2017 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 107404609 A | 11/2017 |
| CN | 108307675 B | 12/2020 |
| CN | 107077743 B | 3/2021 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1734766 A2 | 12/2006 |
| EP | 1991145 A1 | 11/2008 |
| EP | 1243945 B1 | 1/2009 |
| EP | 2026563 A1 | 2/2009 |
| EP | 2031592 A1 | 3/2009 |
| EP | 2041454 A2 | 4/2009 |
| EP | 2072785 A1 | 6/2009 |
| EP | 2104334 A1 | 9/2009 |
| EP | 2136345 A1 | 12/2009 |
| EP | 2156244 A1 | 2/2010 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2386554 A1 | 11/2011 |
| EP | 2462477 A1 | 6/2012 |
| EP | 2502115 A2 | 9/2012 |
| EP | 2569935 A1 | 3/2013 |

(56) References Cited

FOREIGN PATENT DOCUMENTS

| | | |
|---|---|---|
| EP | 2652678 A1 | 10/2013 |
| EP | 2677066 A1 | 12/2013 |
| EP | 2708019 A1 | 3/2014 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3284061 A1 | 2/2018 |
| EP | 3286914 A1 | 2/2018 |
| EP | 3201877 A4 | 3/2018 |
| EP | 2817955 B1 | 4/2018 |
| EP | 2888720 B1 | 3/2021 |
| EP | 3328048 B1 | 4/2021 |
| GB | 2482022 A | 1/2012 |
| IN | 2708/CHENP/2014 A1 | 8/2015 |
| IN | 361194 | 3/2021 |
| JP | 59-025483 | 2/1984 |
| JP | 64-037177 | 2/1989 |
| JP | 02-285772 A | 11/1990 |
| JP | 06129851 A | 5/1994 |
| JP | 07-015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014519741 A | 8/2014 |
| JP | 2014521117 A | 8/2014 |
| JP | 2014535191 A | 12/2014 |
| JP | 2015022510 A | 2/2015 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 | 5/2017 |
| JP | 2017163550 A | 9/2017 |
| JP | 2017163587 A | 9/2017 |
| JP | 2017531976 A | 10/2017 |
| KR | 1020050004239 A | 1/2005 |
| KR | 100496875 B1 | 6/2005 |
| KR | 1020110097647 A | 8/2011 |
| KR | 20140045373 A | 4/2014 |
| KR | 20170063827 A | 6/2017 |
| KR | 101824672 B1 | 2/2018 |
| KR | 101843994 B1 | 3/2018 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011121117 A1 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |

(56) References Cited

FOREIGN PATENT DOCUMENTS

| | | |
|---|---|---|
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014131038 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015048906 A1 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |
| WO | 2016/172125 | 10/2016 |
| WO | 2016167814 A1 | 10/2016 |
| WO | 2016172125 A9 | 4/2017 |
| WO | 2018053181 A1 | 3/2018 |

OTHER PUBLICATIONS

Arnab et al. "Pixelwise instance segmentation with a dynamically instantiated Network," In: Proceedings of the IEEE Conference on Computer Vision and Pattern Recognition, Apr. 7, 2017, Retrieved on Oct. 26, 2020 from https://openaccess.thecvf.com/content_cvpr_2017/papers/Arnab_Pixelwise_Instance_Segmentation_CFPR_2017_paper.pdf, 11 pages.
Bai et al. "Deep watershed transform for instance Segmentation," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Bai_Deep_Watershed_Transform_CVPR_2017_ paper.pdf, 10 pages.
Kirillov et al., "Instancecut: from edges to instances with Multicut," In: Proceedings of the IEEE Conference on Computer Vision and Pattern Recognition, Nov. 24, 2016, Retrieved on Oct. 26, 2020 from https://openaccess.thecvf.com/content_cvpr_2017/papers/Kirillov_InstanceCut_From_Edges_CVPR_2017_paper.pdf, 11 pages.
Kadambi et al. "Polarized 3d: High-quality depth sensing with polarization Cues." Proceedings of the IEEE International Conference on Computer Vision. 2015.
Azorin-Lopez, Jorge, et al. "A Novel Active Imaging Model to Design Visual Systems: A Case of Inspection System for Specular Surfaces." Sensors 17.7 (2017): 1466, 30 pages.
Bajard, Alban, et al. "Non conventional Imaging Systems for 3D Digitization of transparent and/or specular manufactured Objects." QCAV2013, 11th Interntional Conference on Quality Control by Artificial Vision. 2013, 9 pages.
Barnes, Bryan M., et al. "Enhancing 9 nm Node Dense Patterned Defect Optical Inspection using Polarization, Angle, and Focus." Metrology, Inspection, and Process Control for Microlithography XXVII. vol. 8681. International Society for Optics and Photonics, 2013, 8 pages.
Brugés Martelo, Javier, et al. "Paperboard Coating Detection Based on Full-Stokes Imaging Polarimetry." Sensors 21.1 (2021): 208, 14 pages.

Chen, Hua, et al. "Polarization Phase-Based Method for Material Classification in Computer Vision," International Journal of Computer Vision 28(1), 1996, pp. 73-83.
Meriaudeau, Fabrice, et al. "Polarization imaging for industrial Inspection." Image Processing: Machine Vision Applications. vol. 6813. International Society for Optics and Photonics, 2008, 11 pages.
Miyazaki, Daisuke, et al. "Surface normal estimation of black specular objects from multiview polarization Images." Optical Engineering 56.4 (2016): 041303, 18 pages.
Miyazaki, Daisuke, et al. "Polarization-based surface normal estimation of black specular objects from multiple Viewpoints." 2012 Second International Conference on 3D Imaging, Modeling, Processing, Visualization & Transmission. IEEE, 2012, 8 pages.
Morel, Olivier, et al. "Three-Dimensional Inspection of Highly-Reflective Metallic Objects by Polarization Imaging." Electronic Imaging Newsletter 15.2 (2005): 4.
Morel, Olivier, et al. "Visual Behaviour Based Bio-Inspired Polarization Techniques in Computer Vision and Robotics." Developing and Applying Biologically-Inspired Vision Systems: Interdisciplinary Concepts. IGI Global, 2013. 243-272.
Morel, O., et al. "Polarization Imaging for 3D Inspection of Highly Reflective Metallic Objects" Optics and Spectroscopy, vol. 101, No. 1, pp. 11-17, (2006).
Rahmann, Stefan. "Polarization images: a geometric interpretation for shape Analysis." Proceedings 15th International Conference on Pattern Recognition. ICPR—2000. vol. 3. IEEE, 2000, 5 pages.
Stolz, Christophe, et al. "Short review of polarimetric imaging based method for 3D Measurements" Optics, Photonics and Digital Technologies for Imaging Applications IV. vol. 9896. International Society for Optics and Photonics, 2016, 9 pages.
Stolz, Christophe, et al. "Real time polarization imaging of weld pool Surface." Twelfth International Conference on Quality Control by Artificial Vision 2015. vol. 9534. International Society for Optics and Photonics, 2015, 7 pages.
Xu, L. M., et al. "Light source optimization for automatic visual inspection of piston surface Defects" The International Journal of Advanced Manufacturing Technology 91.5 (2017): 2245-2256.
Cui, Zhaopeng, et al. "Polarimetric multi-view Stereo," *Proceedings of the IEEE conference on computer vision and pattern recognition*. 2017, pp. 1558-1567.
He et al. Mask r-cnn, In *Proceedings of the IEEE International Conference on Computer Vision*, pp. 2961-2969, 2017.
Miyazaki et al. Transparent surface modeling from a pair of polarization images. *IEEE Transactions on Pattern Analysis & Machine Intelligence*, vol. 26, (1):73-82, Jan. 2004.
Ren et al. End-to-end instance segmentation with recurrent attention. In *Proceedings of the IEEE Conference on Computer Vision and Pattern Recognition*, pp. 6656-6664, 2017.
Romera-Paredes et al. Recurrent instance segmentation. In *European Conference on Computer Vision*, pp. 312-329. Springer, 2016.
Sajjan, "Learning to See Transparent Objects," In: Google, Feb. 12, 2020, Retrieved on Oct. 26, 2020 from https://ai.ggogleblog.com/2020/02/learning-to-see-transparent-objects.html, 6 pages.
Yvain Quéau, Jean-Denis Durou, Jean-François Aujol. Normal Integration: A Survey. 2016. Hal-01334349v4, 19 pages.
Written Opinion for International Application No. PCT/US2020/048604, dated Nov. 13, 2020, 8 pages.
Written Opinion for International Application No. PCT/US2020/051243, dated Dec. 9, 2020, 9 pages.
International Search Report and Written Opinion for International Application No. PCT/US20/54641, dated Feb. 17, 2021, 13 pages.
US 8,957,977, 08/2014, Kartik et al. (withdrawn).
Ansari et al., "3-D Face Modeling Using Two Views and a Generic Face Model with Application to 3-D Face Recognition", Proceedings of the IEEE Conference on Advanced Video and Signal Based Surveillance, Jul. 22, 2003, 9 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.

(56) References Cited

OTHER PUBLICATIONS

Banz et al., "Real-Time Semi-Global Matching Disparity Estimation on the GPU", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", Computer Graphics (ACM SIGGRAPH Proceedings), Jul. 25, 2006, published Jul. 30, 2006, 1 pg.
Bennett et al., "Multispectral Video Fusion", Computer Graphics (ACM SIGGRAPH Proceedings), Jul. 25, 2006, published Jul. 30, 2006, 1 pg.
Berretti et al., "Face Recognition by Super-Resolved 3D Models from Consumer Depth Cameras", IEEE Transactions on Information Forensics and Security, vol. 9, No. 9, Sep. 2014, pp. 1436-1448.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational Imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Blanz et al., "A Morphable Model for the Synthesis of 3D Faces", In Proceedings of ACM SIGGRAPH 1999, Jul. 1, 1999, pp. 187-194.
Borman, "Topics in Multiframe Superresolution Restoration", Thesis of Sean Borman, Apr. 2004, 282 pgs.
Borman et al., "Image Sequence Processing", Dekker Encyclopedia of Optical Engineering, Oct. 14, 2002, 81 pgs.
Borman et al, "Linear models for multi-frame super-resolution restoration under non-affine registration and spatially varying PSF", Proc. SPIE, May 21, 2004, vol. 5299, 12 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc SPIE, Dec. 28, 1998, vol. 3653, 10 pgs.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Thin wafer-level camera lenses inspired by insect compound Eyes", Optics Express, Nov. 22, 2010, vol. 18, No. 24, pp. 24379-24394.
Bruckner et al., "Artificial compound eye applying Hyperacuity", Optics Express, Dec. 11, 2006, vol. 14, No. 25, pp. 12076-12084.
Bruckner et al., "Driving microoptical imaging systems towards miniature camera Applications", Proc. SPIE, Micro-Optics, May 13, 2010, 11 pgs.
Bryan et al., "Perspective Distortion from Interpersonal Distance is an Implicit Visual Cue for Social Judgments of Faces", PLOS One, vol. 7, Issue 9, Sep. 26, 2012, e45301, doi:10.1371/journal.pone. 0045301, 9 pgs.
Bulat et al., "How far are we from solving the 2D & 3D Face Alignment problem? (and a dataset of 230,000 3D facial Landmarks)", arxiv.org, Cornell University Library, 201 Olin Library Cornell University Ithaca, NY 14853, Mar. 21, 2017.
Cai et al., "3D Deformable Face Tracking with a Commodity Depth Camera", Proceedings of the European Conference on Computer Vision: Part III, Sep. 5-11, 2010, 14pgs.
Capel, "Image Mosaicing and Super-Resolution", Retrieved on Nov. 10, 2012, Retrieved from the Internet at URL:<http://citeseerx. ist.psu.edu/viewdoc/download?doi=10.1.1.226.2643&rep=rep1 &type= pdf>, 2001, 269 pgs.
Caron et al., "Multiple camera types simultaneous stereo calibration, Robotics and Automation (ICRA)", 2011 IEEE International Conference on, May 1, 2011 (May 1, 2011), pp. 2933-2938.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Investigation of Computational Compound-Eye Imaging System with Super-Resolution Reconstruction", IEEE, ISASSP, Jun. 19, 2006, pp. 1177-1180.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Super-resolution reconstruction in a computational compound-eye imaging System", Multidim. Syst. Sign. Process, published online Feb. 23, 2007, vol. 18, pp. 83-101.
Chen et al., "Interactive deformation of light Fields", Symposium on Interactive 3D Graphics, 2005, pp. 139-146.
Chen et al., "KNN Matting", IEEE Transactions on Pattern Analysis and Machine Intelligence, Sep. 2013, vol. 35, No. 9, pp. 2175-2188.
Chen et al., "KNN Matting", 2012 IEEE Conference on Computer Vision and Pattern Recognition, Jun. 16-21, 2012, Providence, RI, USA, pp. 869-876.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Human Face Modeling and Recognition Through Multi-View High Resolution Stereopsis", IEEE Conference on Computer Vision and Pattern Recognition Workshop, Jun. 17-22, 2006, 6 pgs.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic Practice", Journal of Vision, vol. 12, No. 5, Article 8, May 25, 2012, pp. 1-14.
Crabb et al., "Real-time foreground segmentation via range and color Imaging", 2008 IEEE Computer Society Conference on Computer Vision and Pattern Recognition Workshops, Anchorage, AK, USA, Jun. 23-28, 2008, pp. 1-5.
Dainese et al., "Accurate Depth-Map Estimation for 3D Face Modeling", IEEE European Signal Processing Conference, Sep. 4-8, 2005, 4 pgs.
Debevec et al., "Recovering High Dynamic Range Radiance Maps from Photographs", Computer Graphics (ACM SIGGRAPH Proceedings), Aug. 16, 1997, 10 pgs.
Do, Minh N. "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., Immersive Visual Communication, IEEE Signal Processing Magazine, vol. 28, Issue 1, Jan. 2011, DOI: 10.1109/MSP.2010. 939075, Retrieved from: http://minhdo.ece.illinois.edu/publications/ ImmerComm_SPM.pdf, pp. 58-66.
Dou et al., "End-to-end 3D face reconstruction with deep neural Networks", arXiv:1704.05020v1, Apr. 17, 2017, 10 pgs.

(56) References Cited

OTHER PUBLICATIONS

Drouin et al., "Improving Border Localization of Multi-Baseline Stereo Using Border-Cut", International Journal of Computer Vision, Jul. 5, 2006, vol. 83, Issue 3, 8 pgs.

Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.

Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.

Drulea et al., "Motion Estimation Using the Correlation Transform", IEEE Transactions on Image Processing, Aug. 2013, vol. 22, No. 8, pp. 3260-3270, first published May 14, 2013.

Duparre et al., "Microoptical artificial compound eyes—from design to experimental verification of two different Concepts", Proc. of SPIE, Optical Design and Engineering II, vol. 5962, Oct. 17, 2005, pp. 59622A-1-59622A-12.

Duparre et al., Novel Optics/Micro-Optics for Miniature Imaging Systems, Proc. of SPIE, Apr. 21, 2006, vol. 6196, pp. 619607-1-619607-15.

Duparre et al., "Micro-optical artificial compound Eyes", Bioinspiration & Biomimetics, Apr. 6, 2006, vol. 1, pp. R1-R16.

Duparre et al., "Artificial compound eye zoom Camera", Bioinspiration & Biomimetics, Nov. 21, 2008, vol. 3, pp. 1-6.

Duparre et al., "Artificial apposition compound eye fabricated by micro-optics Technology", Applied Optics, Aug. 1, 2004, vol. 43, No. 22, pp. 4303-4310.

Duparre et al., "Micro-optically fabricated artificial apposition compound Eye", Electronic Imaging—Science and Technology, Prod. SPIE 5301, Jan. 2004, pp. 25-33.

Duparre et al., "Chirped arrays of refractive ellipsoidal microlenses for aberration correction under oblique Incidence", Optics Express, Dec. 26, 2005, vol. 13, No. 26, pp. 10539-10551.

Duparre et al., "Artificial compound eyes—different concepts and their application to ultra flat image acquisition Sensors", MOEMS and Miniaturized Systems IV, Proc. SPIE 5346, Jan. 24, 2004, pp. 89-100.

Duparre et al., "Ultra-Thin Camera Based on Artificial Apposition Compound Eyes", 10th Microoptics Conference, Sep. 1-3, 2004, 2 pgs.

Duparre et al., "Microoptical telescope compound Eye", Optics Express, Feb. 7, 2005, vol. 13, No. 3, pp. 889-903.

Duparre et al., "Theoretical analysis of an artificial superposition compound eye for application in ultra flat digital image acquisition Devices", Optical Systems Design, Proc. SPIE 5249, Sep. 2003, pp. 408-418.

Duparre et al., "Thin compound-eye Camera", Applied Optics, May 20, 2005, vol. 44, No. 15, pp. 2949-2956.

Duparre et al., "Microoptical Artificial Compound Eyes—Two Different Concepts for Compact Imaging Systems", 11th Microoptics Conference, Oct. 30-Nov. 2, 2005, 2 pgs.

Eng et al., "Gaze correction for 3D tele-immersive communication System", IVMSP Workshop, 2013 IEEE 11th. IEEE, Jun. 10, 2013.

Fanaswala, "Regularized Super-Resolution of Multi-View Images", Retrieved on Nov. 10, 2012 (Oct. 11, 2012). Retrieved from the Internet at URL: <http://www.site.uottawa.ca/-edubois/theses/Fanaswala_thesis.pdf>, 2009, 163 pgs.

Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.

Fangmin et al., "3D Face Reconstruction Based on Convolutional Neural Network", 2017 10th International Conference on Intelligent Computation Technology and Automation, Oct. 9-10, 2017, Changsha, China.

Farrell et al., "Resolution and Light Sensitivity Tradeoff with Pixel Size", Proceedings of the SPIE Electronic Imaging 2006 Conference, Feb. 2, 2006, vol. 6069, 8 pgs.

Farsiu et al., "Advances and Challenges in Super-Resolution", International Journal of Imaging Systems and Technology, Aug. 12, 2004, vol. 14, pp. 47-57.

Farsiu et al., "Fast and Robust Multiframe Super Resolution", IEEE Transactions on Image Processing, Oct. 2004, published Sep. 3, 2004, vol. 13, No. 10, pp. 1327-1344.

Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.

Fechteler et al., Fast and High Resolution 3D Face Scanning, IEEE International Conference on Image Processing, Sep. 16-Oct. 19, 2007, 4 pgs.

Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.

Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., "Optical System Design", 2nd Edition, SPIE Press, Feb. 14, 2008, pp. 49-58.

Fischer et al., "Optical System Design", 2nd Edition, SPIE Press, Feb. 14, 2008, pp. 191-198.

Garg et al., "Unsupervised CNN for Single View Depth Estimation Geometry to the Rescue", In European: Conference on Computer Vision, Springer, Cham, Jul. 2016, 16 pgs.

Gastal et al., "Shared Sampling for Real-Time Alpha Matting", Computer Graphics Forum, EUROGRAPHICS 2010, vol. 29, Issue 2, May 2010, pp. 575-584.

Georgeiv et al., "Light Field Camera Design for Integral View Photography", Adobe Systems Incorporated, Adobe Technical Report, 2003, 13 pgs.

Georgiev et al., "Light-Field Capture by Multiplexing in the Frequency Domain", Adobe Systems Incorporated, Adobe Technical Report, 2003, 13 pgs.

Godard et al., "Unsupervised Monocular Depth Estimation with Left-Right Consistency", In Proceedings of the IEEE Conference on Computer Vision and Pattern Recognition, 2017, 14 pgs.

Goldman et al., "Video Object Annotation, Navigation, and Composition", In Proceedings of UIST 2008, Oct. 19-22, 2008, Monterey CA, USA, pp. 3-12.

Goodfellow et al., "Generative Adversarial Nets, 2014. Generative adversarial Nets", In Advances in Neural Information Processing Systems (pp. 2672-2680).

Gortler et al., "The Lumigraph", In Proceedings of SIGGRAPH 1996, published Aug. 1, 1996, pp. 43-54.

Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.

Hacohen et al., "Non-Rigid Dense Correspondence with Applications for Image Enhancement", ACM Transactions on Graphics, vol. 30, No. 4, Aug. 7, 2011, 9 pgs.

Hamilton, "JPEG File Interchange Format, Version 1.02", Sep. 1, 1992, 9 pgs.

Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.

Hasinoff et al., "Search-and-Replace Editing for Personal Photo Collections", 2010 International Conference: Computational Photography (ICCP) Mar. 2010, pp. 1-8.

Hernandez et al., "Laser Scan Quality 3-D Face Modeling Using a Low-Cost Depth Camera", 20th European Signal Processing Conference, Aug. 27-31, 2012, Bucharest, Romania, pp. 1995-1999.

(56) References Cited

OTHER PUBLICATIONS

Hernandez-Lopez et al., "Detecting objects using color and depth segmentation with Kinect Sensor", Procedia Technology, vol. 3, Jan. 1, 2012, pp. 196-204, XP055307680, ISSN: 2212-0173, DOI: 10.1016/j.protcy.2012.03.021.
Higo et al., "A Hand-held Photometric Stereo Camera for 3-D Modeling", IEEE International Conference on Computer Vision, 2009, pp. 1234-1241.
Hirschmuller, "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pgs.
Hirschmuller et al., "Memory Efficient Semi-Global Matching, ISPRS Annals of the Photogrammetry", Remote Sensing and Spatial Information Sciences, vol. I-3, 2012, XXII ISPRS Congress, Aug. 25-Sep. 1, 2012, Melbourne, Australia, 6 pgs.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Holoeye Photonics AG, "LC 2012 Spatial Light Modulator (Transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pgs.
Horisaki et al., "Superposition Imaging for Three-Dimensionally Space-Invariant Point Spread Functions", Applied Physics Express, Oct. 13, 2011, vol. 4, pp. 112501-1-112501-3.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horn et al., "LightShop: Interactive Light Field Manipulation and Rendering", In Proceedings of I3D, Jan. 1, 2007, pp. 121-128.
Hossain et al., "Inexpensive Construction of a 3D Face Model from Stereo Images", IEEE International Conference on Computer and Information Technology, Dec. 27-29, 2007, 6 pgs.
Hu et al., "A Quantitative Evaluation of Confidence Measures for Stereo Vision", IEEE Transactions on Pattern Analysis and Machine Intelligence, vol. 34, Issue 11, Nov. 2012, pp. 2121-2133.
Humenberger er al., "A Census-Based Stereo Vision Algorithm Using Modified Semi-Global Matching and Plane Fitting to Improve Matching Quality", IEEE Computer Society Conference on Computer Vision and Pattern Recognition Workshops (CVPRW), IEEE, Jun. 13-18, 2010, San Francisco, CA, 8 pgs.
Isaksen et al., "Dynamically Reparameterized Light Fields", In Proceedings of SIGGRAPH 2000, 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Jackson et al., "Large Post 3D Face Reconstruction from a Single Image via Direct Volumetric CNN Regression", arXiv: 1703.07834v2, Sep. 8, 2017, 9 pgs.
Janoch et al., "A category-level 3-D object dataset: Putting the Kinect to Work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), vol. 1, Jun. 17-22, 2006, New York, NY, USA, pp. 371-378.
Joshi, Color Calibration for Arrays of Inexpensive Image Sensors, Mitsubishi Electric Research Laboratories, Inc., TR2004-137, Dec. 2004, 6 pgs.
Joshi et al., "Synthetic Aperture Tracking: Tracking Through Occlusions", I CCV IEEE 11th International Conference on Computer Vision; Publication [online], Oct. 2007 [retrieved Jul. 28, 2014], Retrieved from the Internet <URL: http:l/ieeexplore.IEEE.org/stamp/stamp.jsp?tp=&arnumber=4409032&isnumber=4408819>, pp. 1-8.
Jourabloo, "Large-Pose Face Alignment via CNN-Based Dense 3D Model Fitting", I CCV IEEE 11th International Conference on Computer Vision; Publication [online], Oct. 2007 [retrieved Jul. 28, 2014]. Retrieved from the Internet: <URL: http:l/ieeexplore.IEEE.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. I-103-I-110.
Keeton, "Memory-Driven Computing", Hewlett Packard Enterprise Company, Oct. 20, 2016, 45 pgs.
Kim, "Scene Reconstruction from a Light Field", Master Thesis, Sep. 1, 2010 (Sep. 1, 2010), pp. 1-72.
Kim et al., "Scene reconstruction from high spatio-angular resolution light Fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing System", Applied Optics, Mar. 10, 2004, vol. 43, No. 8, pp. 1719-1727.
Kittler et al., "3D Assisted Face Recognition: A Survey of 3D Imaging, Modelling, and Recognition Approaches", Proceedings of the IEEE Computer Society Conference on Computer Vision and Pattern Recognition, Jul. 2005, 7 pgs.
Konolige, Kurt "Projected Texture Stereo", 2010 IEEE International Conference on Robotics and Automation, May 3-7, 2010, pp. 148-155.
Kotsia et al., "Facial Expression Recognition in Image Sequences Using Geometric Deformation Features and Support Vector Machines", IEEE Transactions on Image Processing, Jan. 2007, vol. 16, No. 1, pp. 172-187.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lao et al., "3D Template matching for pose invariant face recognition using 3D facial model built with isoluminance line based stereo Vision", Proceedings 15th International Conference on Pattern Recognition, Sep. 3-7, 2000, Barcelona, Spain, pp. 911-916.
Lee, "NFC Hacking: The Easy Way", Defcon Hacking Conference, 2012, 24 pgs.
Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal Matting", CVPR 2011, Jun. 20-25, 2011, pp. 2193-2200.
Lee et al., "Automatic Upright Adjustment of Photographs", IEEE Conference on Computer Vision and Pattern Recognition (CVPR), 2012, pp. 877-884.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.

(56) References Cited

OTHER PUBLICATIONS

Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images with Different Focuses Using Support Vector Machines", IEEE Transactions on Neural Networks, vol. 15, No. 6, Nov. 8, 2004, pp. 1555-1561.
Lim, "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Ma et al., "Constant Time Weighted Median Filtering for Stereo Matching and Beyond", ICCV '13 Proceedings of the 2013 IEEE International Conference on Computer Vision, IEEE Computer Society, Washington DC, USA, Dec. 1-8, 2013, 8 pgs.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
McGuire et al., "Defocus video Matting", ACM Transactions on Graphics (TOG)—Proceedings of ACM SIGGRAPH 2005, vol. 24, Issue 3, Jul. 2005, pp. 567-576.
Medioni et al., "Face Modeling and Recognition in 3-D", Proceedings of the IEEE International Workshop on Analysis and Modeling of Faces and Gestures, 2013, 2 pgs.
Merkle et al., "Adaptation and optimization of coding algorithms for mobile 3DTV", Mobile3DTV Project No. 216503, Nov. 2008, 55 pgs.
Michael et al., "Real-time Stereo Vision: Optimizing Semi-Global Matching", 2013 IEEE Intelligent Vehicles Symposium (IV), IEEE, Jun. 23-26, 2013, Australia, 6 pgs.
Milella et al., "3D reconstruction and classification of natural environments by an autonomous vehicle using multi-baseline Stereo", Intelligent Service Robotics, vol. 7, No. 2, Mar. 2, 2014, pp. 79-92.
Min et al., "Real-Time 3D Face Identification from a Depth Camera", Proceedings of the IEEE International Conference on Pattern Recognition, Nov. 11-15, 2012, 4 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pgs.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Ng et al., "Light Field Photography with a Hand-held Plenoptic Camera", Stanford Tech Report CTSR Feb. 2005, Apr. 20, 2005, pp. 1-11.
Nguyen et al., "Image-Based Rendering with Depth Information Using the Propagation Algorithm", Proceedings. (ICASSP '05).
IEEE International Conference on Acoustics, Speech, and Signal Processing, 2005, vol. 5, Mar. 23-23, 2005, pp. II-589-II-592.
Nguyen et al., "Error Analysis for Image-Based Rendering with Depth Information", IEEE Transactions on Image Processing, vol. 18, Issue 4, Apr. 2009, pp. 703-716.
Nishihara, H.K. "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection Method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Super-Resolution Image Reconstruction", IEEE Signal Processing Magazine, May 2003, pp. 21-36.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "3D Face Reconstruction from Stereo Video", First International Workshop on Video Processing for Security, Jun. 7-9, 2006, Quebec City, Canada, 2006, 8 pgs.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm Wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound Eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds from Real World Events", Proc. of IEEE Visualization '97, Phoenix, Arizona, Oct. 19-24, 1997, pp. 277-283, 552.
Ranjan et al., "HyperFace: A Deep Multi-Task Learning Framework for Face Detection, Landmark Localization, Pose Estimation, and Gender Recognition", May 11, 2016 (May 11, 2016), pp. 1-16.
Rhemann et al., "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image Matting", 2009 IEEE Conference on Computer Vision and Pattern Recognition, Jun. 20-25, 2009, Miami, FL, USA, pp. 1826-1833.
Robert et al., "Dense Depth Map Reconstruction: A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf, on Image Processing, 1999, 5 pgs.
Robertson et al., "Estimation-theoretic approach to dynamic range enhancement using multiple Exposures", Journal of Electronic Imaging, Apr. 2003, vol. 12, No. 2, pp. 219-228.

(56) References Cited

OTHER PUBLICATIONS

Roy et al., "Non-Uniform Hierarchical Pyramid Stereo for Large Images", Computer and Robot Vision, 2002, pp. 208-215.
Rusinkiewicz et al., "Real-Time 3D Model Acquisition", ACM Transactions on Graphics (TOG), vol. 21, No. 3, Jul. 2002, pp. 438-446.
Saatci et al., "Cascaded Classification of Gender and Facial Expression using Active Appearance Models", IEEE, FGR'06, 2006, 6 pgs.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.
Seitz et al., "Plenoptic Image Editing", International Journal of Computer Vision 48, Conference Date Jan. 7, 1998, 29 pgs., DOI: 10.1109/ICCV.1998.710696 Source: DBLP Conference: Computer Vision, Sixth International Conference.
Shechtman et al., "Increasing Space-Time Resolution in Video", European Conference on Computer Vision, LNCS 2350, May 28-31, 2002, pp. 753-768.
Shotton et al., "Real-time human pose recognition in parts from single depth Images", CVPR 2011, Jun. 20-25, 2011, Colorado Springs, CO, USA, pp. 1297-1304.
Shum et al., "Pop-Up Light Field: An Interactive Image-Based Modeling and Rendering System", Apr. 2004, ACM Transactions on Graphics, vol. 23, No. 2, pp. 143-162, Retrieved from http://131.107.65.14/en-us/um/people/jiansun/papers/PopupLightField_TOG.pdf on Feb. 5, 2014.
Shum et al., "A Review of Image-based Rendering Techniques", Visual Communications and Image Processing 2000, May 2000, 12 pgs.
Sibbing et al., "Markerless reconstruction of dynamic facial Expressions", 2009 IEEE 12th International Conference on Computer Vision Workshops, ICCV Workshop: Kyoto, Japan, Sep. 27-Oct. 4, 2009, Institute of Electrical and Electronics Engineers, Piscataway, NJ, Sep. 27, 2009 (Sep. 27, 2009), pp. 1778-1785.
Silberman et al., "Indoor segmentation and support inference from RGBD Images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 Lenses", Stanford Report, Mar. 19, 2008, Retrieved from: http://news.stanford.edu/news/2008/March19/camera-031908.html, 5 pgs.
Stollberg et al., "The Gabor superlens as an alternative wafer-level camera approach inspired by superposition compound eyes of nocturnal Insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pgs.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Thin observation module by bound optics (TOMBO): concept and experimental Verification", Applied Optics, Apr. 10, 2001, vol. 40, No. 11, pp. 1806-1813.
Tanida et al., "Color imaging with an integrated compound imaging System", Optics Express, Sep. 8, 2003, vol. 11, No. 18, pp. 2109-2117.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the Future?", American Cinematographer, vol. 77, No. 9, Sep. 1996, pp. 93-100.
Tseng et al., "Automatic 3-D depth recovery from a single urban-scene Image", 2012 Visual Communications and Image Processing, Nov. 27-30, 2012, San Diego, CA, USA, pp. 1-6.
Uchida et al., 3D Face Recognition Using Passive Stereo Vision, IEEE International Conference on Image Processing 2005, Sep. 14, 2005, 4 pgs.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Using Plane + Parallax for Calibrating Dense Camera Arrays", IEEE Conference on Computer Vision and Pattern Recognition (CVPR), 2004, 8 pgs.
Vaish et al., "Synthetic Aperture Focusing Using a Shear-Warp Factorization of the Viewing Transform", IEEE Workshop on A3DISS, CVPR, 2005, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park-Observational Astronomy (ASTR 310), Oct. 19, 2006, pp. 1-5 [online], [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-to-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL Jan. 2001, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Soft scissors: an interactive tool for realtime high quality Matting", ACM Transactions on Graphics (TOG)—Proceedings of ACM SIGGRAPH 2007, vol. 26, Issue 3, Article 9, Jul. 2007, 6 pg., published Aug. 5, 2007.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Facial Feature Point Detection: A Comprehensive Survey", arXiv: 1410.1037v1, Oct. 4, 2014, 32 pgs..
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Widanagamaachchi et al., "3D Face Recognition from 2D Images: A Survey", Proceedings of the International Conference on Digital Image Computing: Techniques and Applications, Dec. 1-3, 2008, 7 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.

(56) References Cited

OTHER PUBLICATIONS

Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera Objective", Proceedings of SPIE, Optical Design and Engineering II, Oct. 15, 2005, pp. 59622C-1-59622C-11.
Wu et al., "A virtual view synthesis algorithm based on image Inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "Superresolution Using Preconditioned Conjugate Gradient Method", Proceedings of SPIE—The International Society for Optical Engineering, Jul. 2002, 8 pgs.
Yang et al., "A Real-Time Distributed Light Field Camera", Eurographics Workshop on Rendering (2002), published Jul. 26, 2002, pp. 1-10.
Yang et al., Model-based Head Pose Tracking with Stereovision, Microsoft Research, Technical Report, MSR-TR-2001-102, Oct. 2001, 12 pgs.
Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zbontar et al., Computing the Stereo Matching Cost with a Convolutional Neural Network, CVPR, 2015, pp. 1592-1599.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet Camera", proceedings of SPIE, vol. 7705, Apr. 23, 2010, pp. 770505-770505-8, XP055113797 ISSN: 0277-786X, DOI: 10.1117/12.852171.
Zhang et al., "Spacetime Faces: High Resolution Capture for Modeling and Animation", ACM Transactions on Graphics, 2004, 11pgs.
Zheng et al., "Balloon Motion Estimation Using Two Frames", Proceedings of the Asilomar Conference on Signals, Systems and Computers, IEEE, Comp. Soc. Press, US, vol. 2 of 2, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.
"File Formats Version 6", Alias Systems, 2004, 40 pgs.
"Light fields and computational Photography", Stanford Computer Graphics Laboratory, Retrieved from: http://graphics.stanford.edu/projects/lightfield/, Earliest publication online: Feb. 10, 1997, 3 pgs.
"Exchangeable image file format for digital still cameras: Exif Version 2.2"_, Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.

\* cited by examiner

SYSTEMS AND METHODS FOR SURFACE MODELING USING POLARIZATION CUES

CROSS-REFERENCE TO RELATED APPLICATION(S)

This application is a U.S. National Phase Patent Application of International Application Number PCT/US2020/051243, filed on Sep. 17, 2020, which claims priority to and the benefit of U.S. Provisional Patent Application No. 62/901,731, filed in the United States Patent and Trademark Office on Sep. 17, 2019 and which claims priority to and the benefit of U.S. Provisional Patent Application No. 63/001,445, filed in the United States Patent and Trademark Office on Mar. 29, 2020, the entire disclosures of each of which is incorporated by reference herein.

FIELD

Aspects of embodiments of the present disclosure relate to the field of computer vision and the modeling of surfaces of objects using machine vision.

BACKGROUND

Large scale surface modeling is often desirable in manufacturing for a variety of reasons. One area of use is in the manufacturing of automobiles and automotive parts, where surface modeling using computer vision or machine vision provides methods for automated inspection of the scanned surfaces, which may improve efficiency and result in cost reduction in manufacturing.

Large scale surface modeling may also be applied in other contexts, such as laboratory work and inspection of individual workpieces outside of large scale manufacturing.

SUMMARY

Aspects of embodiments of the present disclosure relate to surface modeling by using light polarization (e.g., the rotation of light waves) to provide additional channels of information to the process of characterizing the surfaces of objects. Aspects of embodiments of the present disclosure may be applied in scenarios such as manufacturing, where surface characterization is used to perform object inspection as a component of a quality assurance process, such as detecting defective goods produced on a manufacturing line and removing or repairing those defective objects.

According to one embodiment of the present disclosure, a computer-implemented method for surface modeling includes: receiving one or more polarization raw frames of a surface of a physical object, the polarization raw frames being captured at different polarizations by a polarization camera including a polarizing filter; extracting one or more first tensors in one or more polarization representation spaces from the polarization raw frames; and detecting a surface characteristic of the surface of the physical object based on the one or more first tensors in the one or more polarization representation spaces.

The one or more first tensors in the one or more polarization representation spaces may include: a degree of linear polarization (DOLP) image in a DOLP representation space; and an angle of linear polarization (AOLP) image in an AOLP representation space.

The one or more first tensors may further include one or more non-polarization tensors in one or more non-polarization representation spaces, and the one or more non-polarization tensors may include one or more intensity images in intensity representation space.

The one or more intensity images may include: a first color intensity image; a second color intensity image; and a third color intensity image.

The surface characteristic may include a detection of a defect in the surface of the physical object.

The detecting the surface characteristic may include: loading a stored model corresponding to a location of the surface of the physical object; and computing the surface characteristic in accordance with the stored model and the one or more first tensors in the one or more polarization representation spaces.

The stored model may include one or more reference tensors in the one or more polarization representation spaces, and the computing the surface characteristic may include computing a difference between the one or more reference tensors and the one or more first tensors in the one or more polarization representation spaces.

The difference may be computed using a Fresnel distance.

The stored model may include a reference three-dimensional mesh, and the computing the surface characteristic may include: computing a three-dimensional point cloud of the surface of the physical object based on the one or more first tensors in the one or more polarization representation spaces; and computing a difference between the three-dimensional point cloud and the reference three-dimensional mesh.

The stored model may include a trained statistical model configured to compute a prediction of the surface characteristic based on the one or more first tensors in the one or more polarization representation spaces.

The trained statistical model may include an anomaly detection model.

The trained statistical model may include a convolutional neural network trained to detect defects in the surface of the physical object.

The trained statistical model may include a trained classifier trained to detect defects.

According to one embodiment of the present disclosure, a system for surface modeling includes: a polarization camera including a polarizing filter, the polarization camera being configured to capture polarization raw frames at different polarizations; and a processing system including a processor and memory storing instructions that, when executed by the processor, cause the processor to: receive one or more polarization raw frames of a surface of a physical object, the polarization raw frames corresponding to different polarizations of light; extract one or more first tensors in one or more polarization representation spaces from the polarization raw frames; and detect a surface characteristic of the surface of the physical object based on the one or more first tensors in the one or more polarization representation spaces.

The one or more first tensors in the one or more polarization representation spaces may include: a degree of linear polarization (DOLP) image in a DOLP representation space; and an angle of linear polarization (AOLP) image in an AOLP representation space.

The one or more first tensors may further include one or more non-polarization tensors in one or more non-polarization representation spaces, and the one or more non-polarization tensors may include one or more intensity images in intensity representation space.

The one or more intensity images may include: a first color intensity image; a second color intensity image; and a third color intensity image.

The surface characteristic may include a detection of a defect in the surface of the physical object.

The memory may further store instructions that, when executed by the processor, cause the processor to detect the surface characteristic by: loading a stored model corresponding to a location of the surface of the physical object; and computing the surface characteristic in accordance with the stored model and the one or more first tensors in the one or more polarization representation spaces.

The stored model may include one or more reference tensors in the one or more polarization representation spaces, and the memory may further store instructions that, when executed by the processor, cause the processor to compute the surface characteristic by computing a difference between the one or more reference tensors and the one or more first tensors in the one or more polarization representation spaces.

The difference may be computed using a Fresnel distance.

The stored model may include a reference three-dimensional mesh, and the memory may further store instructions that, when executed by the processor, cause the processor to compute the surface characteristic by: computing a three-dimensional point cloud of the surface of the physical object based on the one or more first tensors in the one or more polarization representation spaces; and computing a difference between the three-dimensional point cloud and the reference three-dimensional mesh.

The stored model may include a trained statistical model configured to compute a prediction of the surface characteristic based on the one or more first tensors in the one or more polarization representation spaces.

The trained statistical model may include an anomaly detection model.

The trained statistical model may include a convolutional neural network trained to detect defects in the surface of the physical object.

The trained statistical model may include a trained classifier trained to detect defects.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
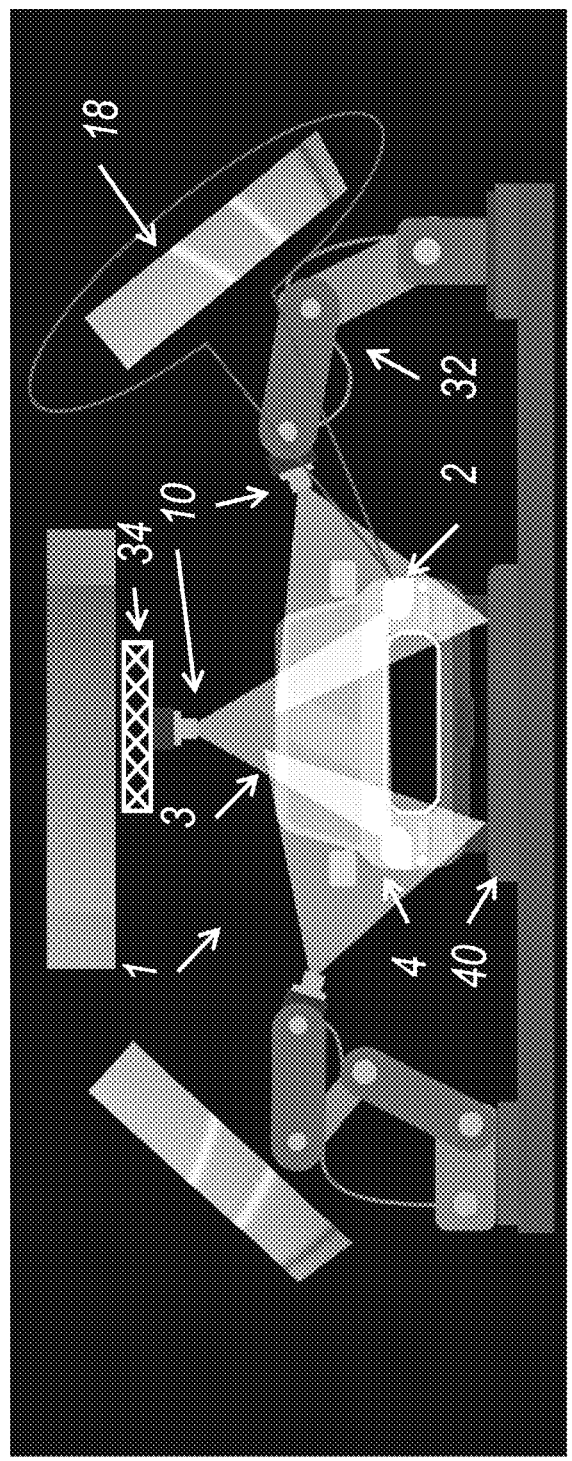
FIG. 1A is a schematic depiction of surfaces of an object (e.g., an automobile) under inspection by a surface characterization system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As used herein, the term "surface modeling" refers to capturing information about the surfaces of real-world objects, such as the three-dimensional shape of the surface, and may also include capturing color (or "texture") information about the surface and other information about the reflectivity of the surface (e.g., a bidirectional reflectance distribution function or BRDF).

Surface profile examination is important in analyzing the intrinsic shape and curvature properties or characteristics of surfaces. Surface modeling of real-world objects has applications in many areas in which the characterization of surfaces is desired. For example, in manufacturing, surface modeling may be used to perform inspection of the objects produced through the manufacturing process, thereby enabling the detection of defects in the objects (or manufactured goods or workpieces) and removal of those defective objects from the manufacturing stream. One area of use is in the manufacturing of automobiles and automotive parts, such as in the automatic detection of defective automotive parts, where a computer vision or machine vision system captures images of the automotive parts (e.g., using one or more cameras) and generates a classification result and/or other detection information regarding the quality of the part, such as whether a window is scratched or whether a door panel is dented. Applying surface modeling techniques using computer vision to perform automated inspection of the scanned surfaces improves the efficiency and reduces costs in manufacturing, such as by detecting errors early in the manufacturing or assembly process.

Computer vision and machine vision techniques enable rapid and contactless surface modeling, in contrast to, for example, contact three-dimensional (3-D) scanners that probe a subject through physical touch. However, comparative computer vision techniques, whether performed passively (e.g., without additional illumination) or actively (e.g., with an active illumination device, which may emit structure light), may fail to reliably certain classes of surface characteristics that may be termed "optically challenging." These may be circumstances where the color of the defect is very similar to the background color of the surface on which the defect appears. For example, defects such as scratches in a glass window or in the clear coat layers of a glossy paint and shallow dents in painted or unpainted metal surfaces may often be difficult to see in a standard color image of a surface, because the color (or texture) variation due to these defects may be relatively small. In other words, the contrast between the color of the defect and the color of the non-defective (or "clean") surfaces may be relatively small, such as where a dent in a painted door panel has the same color as in the undented portion Accordingly, some aspects of embodiments of the present disclosure relate to detecting defects in objects based on polarization features of objects, as computed based on raw polarization frames captured of objects under inspection using one or more polarization cameras (e.g., cameras that include a polarizing filter in the optical path). Polarization-enhanced imaging can provide, in some embodiments, order of magnitude improvements to the characterization of the shapes of surface, including the accuracy of the detected direction of surface normals. Aesthetically smooth surfaces cannot have bumps or dents, which are essentially variations in local curvature which in turn are defined by their surface normal representations. Accordingly, some embodiments of the present disclosure can be applied to smoothness detection and shape fidelity in high precision manufacturing of industrial parts. One use case involves the inspection of manufactured parts before they leave the assembly line for delivery to the end customer. In many manufacturing systems, manufactured parts come off the assembly line on a conveyor system (e.g., on a conveyor belt) at high rates and, for efficiency of throughput, require that the inspection happen while the part is still moving, and with very little time between parts.

As such, some aspects of embodiments of the present disclosure relate to systems and methods for surface characterization, including through the capture of polarization raw frames of the surfaces to be characterized, and computing characterizations, such as detecting defects in the surface, based on those polarization raw frames.

FIG. 1A is a schematic depiction of surfaces of an object (e.g., an automobile) under inspection by a surface characterization system according to one embodiment of the present disclosure. In the arrangement shown in FIG. 1A, an object under inspection 1 may be within a scene or environment. For example, in the context of a factory or other manufacturing plant, the object under inspection 1 may be located on an assembly line and may be in motion on a conveyor system 40 such as a conveyor belt or an overhead conveyor (e.g., an overhead chain conveyor). The object under inspection 1 may have one or more surfaces (labeled in FIG. 1A as surface 2, surface 3, and surface 4), which are imaged by one or more polarization cameras 10. The polarization cameras 10 may be mounted on a mount, where the mount may be a movable mount, such as on an end-effector of a robotic arm 32 or may be a fixed mount, such as fixed on a gantry 34 above the conveyor system or as part of the conveyor system. The polarization cameras 10 capture polarization raw frames (images) 18 of various surfaces 2, 3, and 4 of the object under inspection 1, where each polarization camera 10 includes a polarizing filter in its optical path.

Figure 1B:
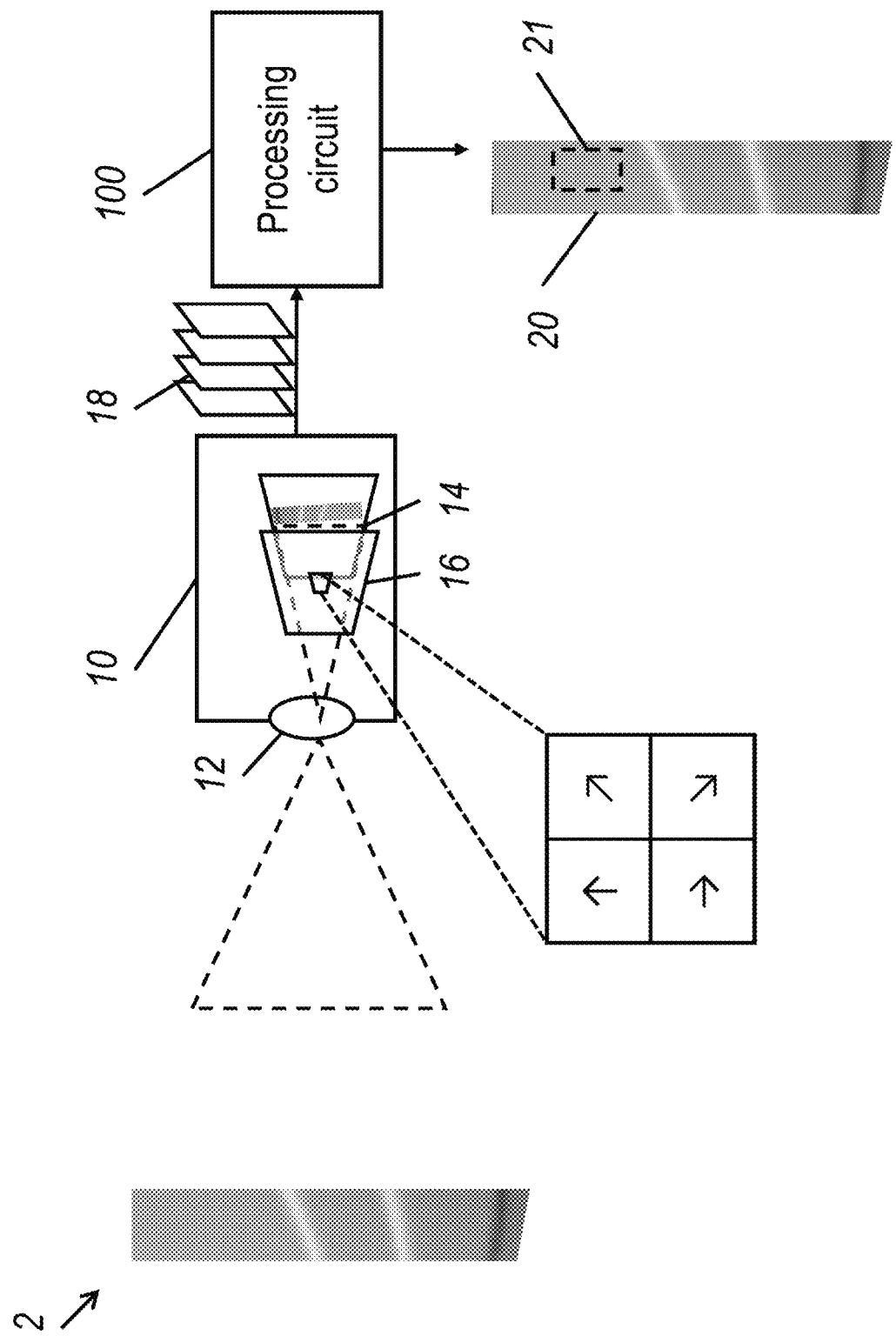
FIG. 1B is a schematic block diagram of a surface characterization system according to one embodiment of the present invention.

FIG. 1B is a schematic block diagram of a surface characterization system according to one embodiment of the present invention. In particular, FIG. 1B depicts one of the polarization cameras 10 configured to image surface 2 of the object under inspection 1. In the embodiment shown in FIG. 1B, a polarization camera 10 has a lens 12 with a field of view, where the lens 12 and the camera 10 are oriented such that the field of view encompasses the surface under inspection (e.g., surface under inspection 2 of the object under inspection 1). The lens 12 is configured to direct light (e.g., focus light) from the scene (e.g., from the surface under inspection) onto a light sensitive medium such as an image sensor 14 (e.g., a complementary metal oxide semiconductor (CMOS) image sensor or charge-coupled device (CCD) image sensor).

The polarization camera 10 further includes a polarizer or polarizing filter or polarization mask 16 placed in the optical path between the scene 1 and the image sensor 14. According to various embodiments of the present disclosure, the polarizer or polarization mask 16 is configured to enable the polarization camera 10 to capture images of the scene 1 with the polarizer set at various specified angles (e.g., at 45° rotations or at 60° rotations or at non-uniformly spaced rotations).

As one example, FIG. 1B depicts an embodiment where the polarization mask 16 is a polarization mosaic aligned with the pixel grid of the image sensor 14 in a manner similar to a red-green-blue (RGB) color filter (e.g., a Bayer filter) of a color camera. In a manner similar to how a color filter mosaic filters incoming light based on wavelength such that each pixel in the image sensor 14 receives light in a particular portion of the spectrum (e.g., red, green, or blue) in accordance with the pattern of color filters of the mosaic, a polarization mask 16 using a polarization mosaic filters light based on linear polarization such that different pixels receive light at different angles of linear polarization (e.g., at 0°, 45°, 90°, and 135°, or at 0°, 60° degrees, and 120°). Accordingly, the polarization camera 10 using a polarization mask 16 such as that shown in FIG. 1 is capable of concurrently or simultaneously capturing light at four different linear polarizations. One example of a polarization camera is the Blackfly® S Polarization Camera produced by FLIR® Systems, Inc. of Wilsonville, Oreg.

While the above description relates to some possible implementations of a polarization camera using a polarization mosaic, embodiments of the present disclosure are not limited thereto and encompass other types of polarization cameras that are capable of capturing images at multiple different polarizations. For example, the polarization mask 16 may have fewer than four polarizations or more than four different polarizations, or may have polarizations at different angles than those stated above (e.g., at angles of polarization of: 0°, 60°, and 120° or at angles of polarization of 0°, 30°, 60°, 90°, 120°, and 150°). As another example, the polarization mask 16 may be implemented using an electronically controlled polarization mask, such as an electro-optic modulator (e.g., may include a liquid crystal layer), where the polarization angles of the individual pixels of the mask may be independently controlled, such that different portions of the image sensor 14 receive light having different polarizations. As another example, the electro-optic modulator may be configured to transmit light of different linear polarizations when capturing different frames, e.g., so that the camera captures images with the entirety of the polarization mask set to, sequentially, to different linear polarizer angles (e.g., sequentially set to: 0 degrees; 45 degrees; 90 degrees; or 135 degrees). As another example, the polarization mask 16 may include a polarizing filter that rotates mechanically, such that different polarization raw frames are captured by the polarization camera 10 with the polarizing filter mechanically rotated with respect to the lens 12 to transmit light at different angles of polarization to image sensor 14. Furthermore, while the above examples relate to the use of a linear polarizing filter, embodiments of the present disclosure are not limited thereto and also include the use of polarization cameras that include circular polarizing filters (e.g., linear polarizing filters with a quarter wave plate). Accordingly, in various embodiments of the present disclosure, a polarization camera uses a polarizing filter to capture multiple polarization raw frames at different polarizations of light, such as different linear polarization angles and different circular polarizations (e.g., handedness).

As a result, the polarization camera 10 captures multiple input images 18 (or polarization raw frames) of the scene including the surface under inspection 2 of the object under inspection 1. In some embodiments, each of the polarization raw frames 18 corresponds to an image taken behind a polarization filter or polarizer at a different angle of polarization $\phi_{pol}$ (e.g., 0 degrees, 45 degrees, 90 degrees, or 135 degrees). Each of the polarization raw frames 18 is captured from substantially the same pose with respect to the scene 1 (e.g., the images captured with the polarization filter at 0 degrees, 45 degrees, 90 degrees, or 135 degrees are all captured by a same polarization camera 100 located at a same location and orientation), as opposed to capturing the polarization raw frames from disparate locations and orientations with respect to the scene. The polarization camera 10 may be configured to detect light in a variety of different portions of the electromagnetic spectrum, such as the human-visible portion of the electromagnetic spectrum, red, green, and blue portions of the human-visible spectrum, as well as invisible portions of the electromagnetic spectrum such as infrared and ultraviolet.

In some embodiments of the present disclosure, such as some of the embodiments described above, the different polarization raw frames are captured by a same polarization camera 10 and therefore may be captured from substantially the same pose (e.g., position and orientation) with respect to the scene 1. However, embodiments of the present disclosure are not limited thereto. For example, a polarization camera 10 may move with respect to the scene 1 between different polarization raw frames (e.g., when different raw polarization raw frames corresponding to different angles of polarization are captured at different times, such as in the case of a mechanically rotating polarizing filter), either because the polarization camera 10 has moved or because object 1 has moved (e.g., if the object is on a moving conveyor system). In some embodiments, different polarization cameras capture images of the object at different times, but from substantially the same pose with respect to the object (e.g., different cameras capturing images of the same surface of the object at different points in the conveyor system). Accordingly, in some embodiments of the present disclosure different polarization raw frames are captured with the polarization camera 10 at different poses or the same relative pose with respect to the object under inspection 1 and/or the surface under inspection 2.

The polarization raw frames 18 are supplied to a processing circuit 100, described in more detail below, which computes a characterization output 20 based on the polarization raw frames 18. In the embodiment shown in FIG. 1B, the characterization output 20, includes a region 21 of the image of the surface 2 in which a defect is detected (e.g., a dent in a door of an automobile).

Figure 2B:
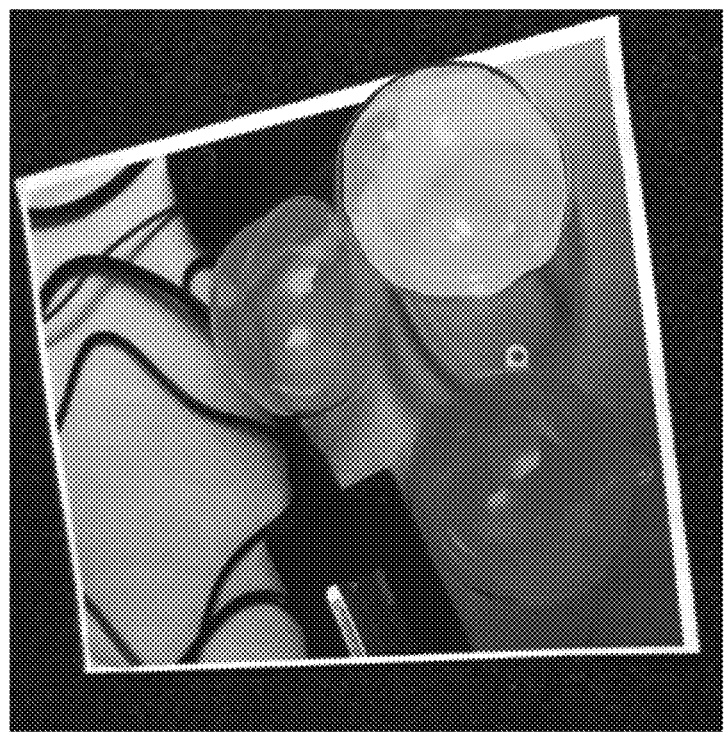
FIG. 2B depicts the intensity image of FIG. 2A with an overlaid segmentation mask as computed by a Mask Region-based Convolutional Neural Network (Mask R-CNN) identifying instances of transparent balls, where the real transparent ball is correctly identified as an instance, and the two spoofs are incorrectly identified as instances.
Figure 2A:
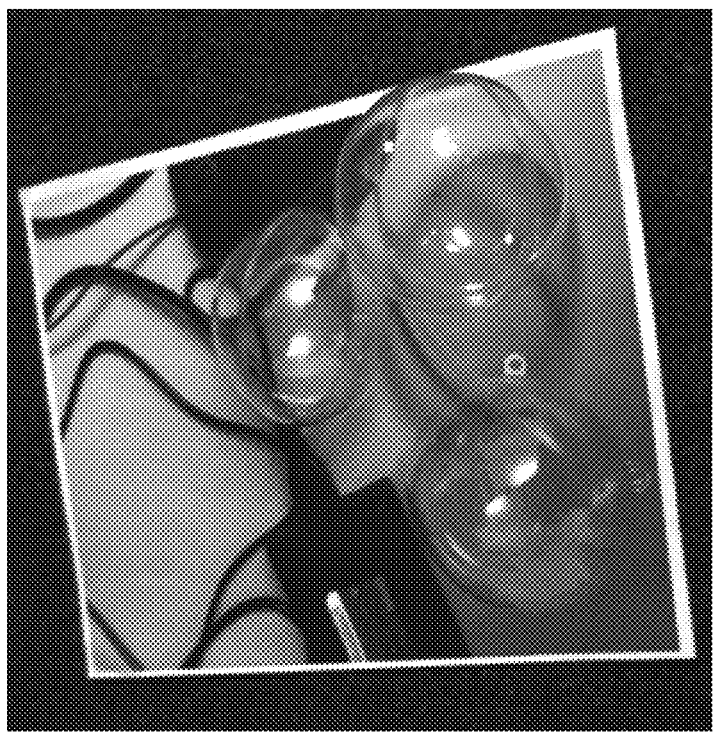
FIG. 2A is an image or intensity image of a scene with one real transparent ball placed on top of a printout of photograph depicting another scene containing two transparent balls ("spoofs") and some background clutter.

FIGS. 2A, 2B, 2C, and 2D provide background for illustrating the segmentation maps computed by a comparative approach and semantic segmentation or instance segmentation based on polarization raw frames according to embodiments of the present disclosure. In more detail, FIG. 2A is an image or intensity image of a scene with one real transparent ball placed on top of a printout of photograph depicting another scene containing two transparent balls ("spoofs") and some background clutter. FIG. 2B depicts a segmentation mask as computed by a Mask Region-based Convolutional Neural Network (Mask R-CNN) identifying instances of transparent balls overlaid on the intensity image of FIG. 2A using different patterns of lines, where the real transparent ball is correctly identified as an instance, and the two spoofs are incorrectly identified as instances. In other words, the Mask R-CNN algorithm has been fooled into labeling the two spoof transparent balls as instances of actual transparent balls in the scene.

Figure 2D:
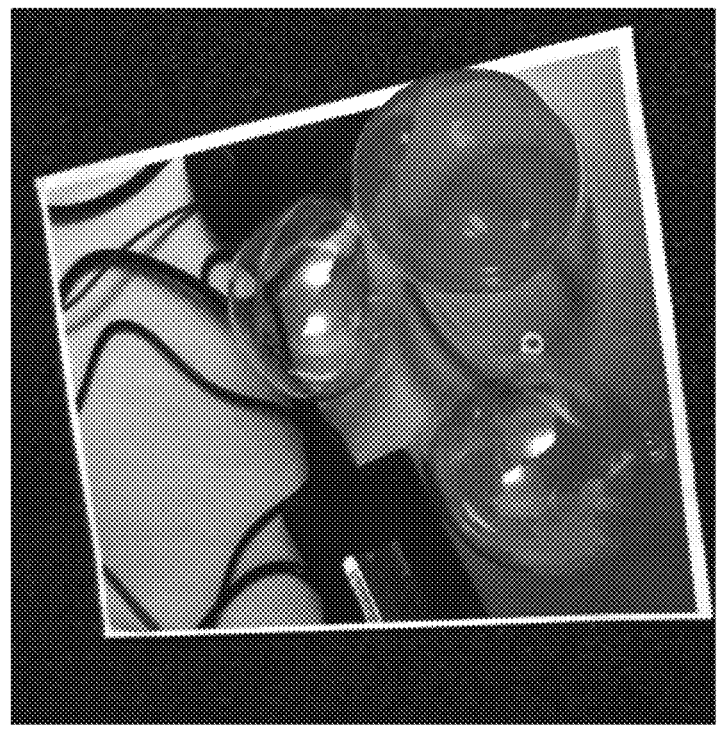
FIG. 2D depicts the intensity image of FIG. 2A with an overlaid segmentation mask as computed using polarization data in accordance with an embodiment of the present invention, where the real transparent ball is correctly identified as an instance and the two spoofs are correctly excluded as instances.
Figure 2C:
FIG. 2C is an angle of polarization image computed from polarization raw frames captured of the scene according to one embodiment of the present invention.

FIG. 2C is an angle of linear polarization (AOLP) image computed from polarization raw frames captured of the scene according to one embodiment of the present invention. As shown in FIG. 2C, transparent objects have a very unique texture in polarization space such as the AOLP domain, where there is a geometry-dependent signature on edges and a distinct or unique or particular pattern that arises on the surfaces of transparent objects in the angle of linear polarization. In other words, the intrinsic texture of the transparent object (e.g., as opposed to extrinsic texture adopted from the background surfaces visible through the transparent object) is more visible in the angle of polarization image of FIG. 2C than it is in the intensity image of FIG. 2A.

FIG. 2D depicts the intensity image of FIG. 2A with an overlaid segmentation mask as computed using polarization data in accordance with an embodiment of the present invention, where the real transparent ball is correctly identified as an instance using an overlaid pattern of lines and the two spoofs are correctly excluded as instances (e.g., in contrast to FIG. 2B, FIG. 2D does not include overlaid patterns of lines over the two spoofs). While FIGS. 2A, 2B, 2C, and 2D illustrate an example relating to detecting a real transparent object in the presence of spoof transparent objects, embodiments of the present disclosure are not limited thereto and may also be applied to other optically challenging objects, such as transparent, translucent, and non-matte or non-Lambertian objects, as well as non-reflective (e.g., matte black objects) and multipath inducing objects.

Accordingly, some aspects of embodiments of the present disclosure relate to extracting, from the polarization raw frames, tensors in representation space (or first tensors in first representation spaces, such as polarization feature maps) to be supplied as input to surface characterization algorithms or other computer vision algorithms. These first tensors in first representation space may include polarization feature maps that encode information relating to the polarization of light received from the scene such as the AOLP image shown in FIG. 2C, degree of linear polarization (DOLP) feature maps, and the like (e.g., other combinations from Stokes vectors or transformations of individual ones of the polarization raw frames). In some embodiments, these polarization feature maps are used together with non-polarization feature maps (e.g., intensity images such as the image shown in FIG. 2A) to provide additional channels of information for use by semantic segmentation algorithms.

While embodiments of the present invention are not limited to use with particular surface characterization algorithms, some aspects of embodiments of the present invention relate to deep learning frameworks for polarization-based surface characterization of transparent objects (e.g., glass windows of vehicles and transparent glossy layers of paints) or other optically challenging objects (e.g., transparent, translucent, non-Lambertian, multipath inducing objects, and non-reflective (e.g., very dark) objects), where these frameworks may be referred to as Polarized Convolutional Neural Networks (Polarized CNNs). This Polarized CNN framework includes a backbone that is suitable for processing the particular texture of polarization and can be coupled with other computer vision architectures such as Mask R-CNN (e.g., to form a Polarized Mask R-CNN architecture) to produce a solution for accurate and robust characterization of transparent objects and other optically challenging objects. Furthermore, this approach may be applied to scenes with a mix of transparent and non-transparent (e.g., opaque objects) and can be used to characterize transparent, translucent, non-Lambertian, multipath inducing, dark, and opaque surfaces of the object or objects under inspection.

Polarization Feature Representation Spaces

Some aspects of embodiments of the present disclosure relate to systems and methods for extracting features from polarization raw frames in operation 650, where these extracted features are used in operation 690 in the robust detection of optically challenging characteristics in the surfaces of objects. In contrast, comparative techniques relying on intensity images alone may fail to detect these optically challenging features or surfaces (e.g., comparing the intensity image of FIG. 2A with the AOLP image of FIG. 2C, discussed above). The term "first tensors" in "first representation spaces" will be used herein to refer to features computed from (e.g., extracted from) polarization raw frames 18 captured by a polarization camera, where these first representation spaces include at least polarization feature spaces (e.g., feature spaces such as AOLP and DOLP that contain information about the polarization of the light detected by the image sensor) and may also include non-polarization feature spaces (e.g., feature spaces that do not require information regarding the polarization of light reaching the image sensor, such as images computed based solely on intensity images captured without any polarizing filters).

Figure 3:
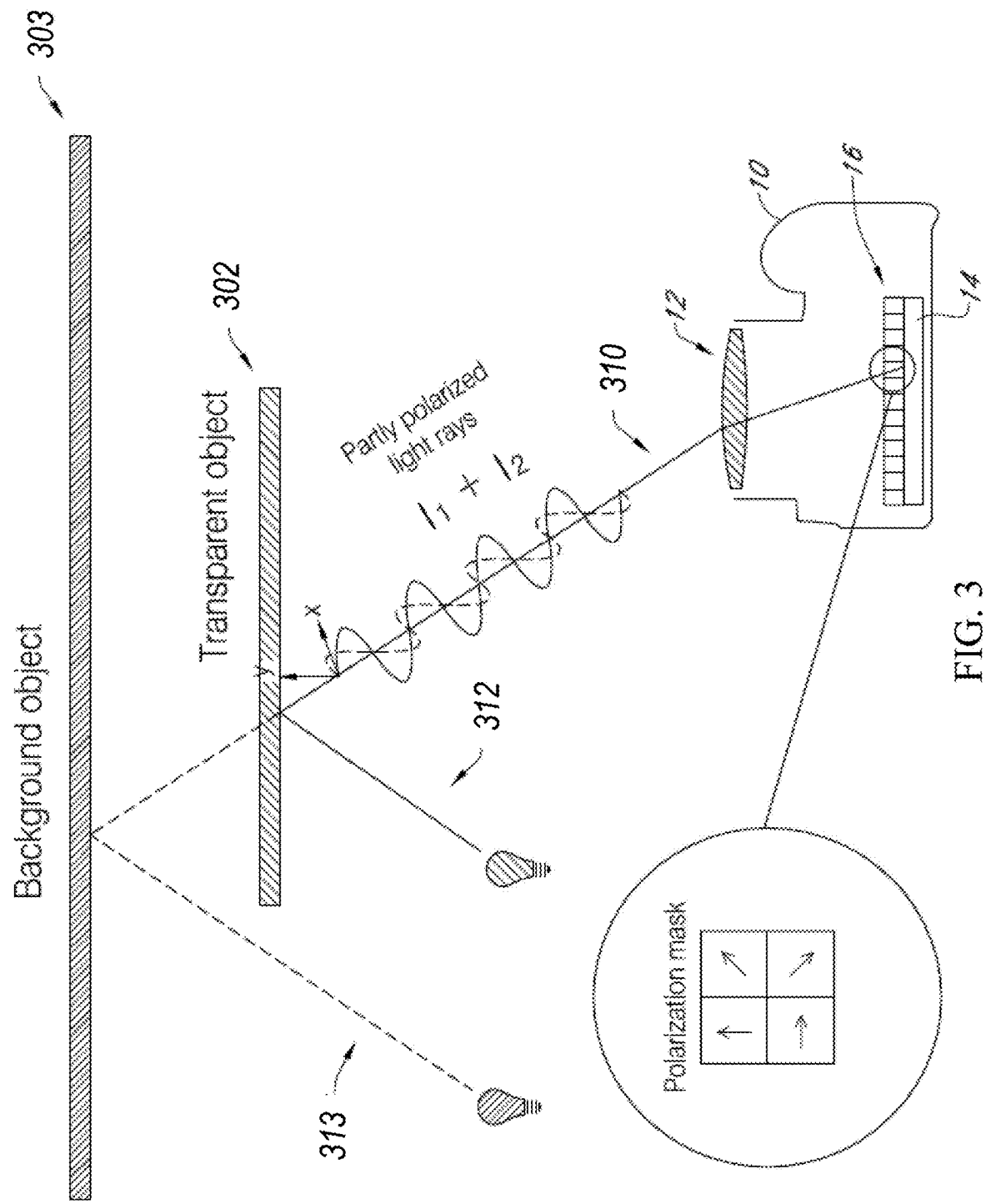
FIG. 3 is a high-level depiction of the interaction of light with transparent objects and non-transparent (e.g., diffuse and/or reflective) objects.

The interaction between light and transparent objects is rich and complex, but the material of an object determines its transparency under visible light. For many transparent household objects, the majority of visible light passes straight through and a small portion (~4% to ~8%, depending on the refractive index) is reflected. This is because light in the visible portion of the spectrum has insufficient energy to excite atoms in the transparent object. As a result, the texture (e.g., appearance) of objects behind the transparent object (or visible through the transparent object) dominate the appearance of the transparent object. For example, when looking at a transparent glass cup or tumbler on a table, the appearance of the objects on the other side of the tumbler (e.g., the surface of the table) generally dominate what is seen through the cup. This property leads to some difficulties when attempting to detect surface characteristics of transparent objects such as glass windows and glossy, transparent layers of paint, based on intensity images alone:

FIG. 3 is a high-level depiction of the interaction of light with transparent objects and non-transparent (e.g., diffuse and/or reflective) objects. As shown in FIG. 3, a polarization camera 10 captures polarization raw frames of a scene that includes a transparent object 302 in front of an opaque background object 303. A light ray 310 hitting the image sensor 14 of the polarization camera 10 contains polarization information from both the transparent object 302 and the background object 303. The small fraction of reflected light 312 from the transparent object 302 is heavily polarized, and thus has a large impact on the polarization measurement, in contrast to the light 313 reflected off the background object 303 and passing through the transparent object 302.

Similarly, a light ray hitting the surface of an object may interact with the shape of the surface in various ways. For example, a surface with a glossy paint may behave substantially similarly to a transparent object in front of an opaque object as shown in FIG. 3, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 310 hitting the image sensor 16 of a polarization camera 10 has three measurable components: the intensity of light (intensity image/I), the percentage or proportion of light that is linearly polarized (degree of linear polarization/DOLP/$\rho$), and the direction of that linear polarization (angle of linear polarization/AOLP/$\phi$). These properties encode information about the surface curvature and material of the object being imaged, which can be used by the predictor 800 to detect transparent objects, as described in more detail below. In some embodiments, the predictor 800 can detect other optically challenging objects based on similar polarization properties of light passing through translucent objects and/or light interacting with multipath inducing objects or by non-reflective objects (e.g., matte black objects).

Therefore, some aspects of embodiments of the present invention relate to using a feature extractor 700 to compute first tensors in one or more first representation spaces, which may include derived feature maps based on the intensity I, the DOLP $\rho$, and the AOLP $\phi$. The feature extractor 700 may generally extract information into first representation spaces (or first feature spaces) which include polarization representation spaces (or polarization feature spaces) such as "polarization images," in other words, images that are extracted based on the polarization raw frames that would not otherwise be computable from intensity images (e.g., images captured by a camera that did not include a polarizing filter or other mechanism for detecting the polarization of light reaching its image sensor), where these polarization images may include DOLP ρ images (in DOLP representation space or feature space), AOLP ϕ images (in AOLP representation space or feature space), other combinations of the polarization raw frames as computed from Stokes vectors, as well as other images (or more generally first tensors or first feature tensors) of information computed from polarization raw frames. The first representation spaces may include non-polarization representation spaces such as the intensity I representation space.

Measuring intensity I, DOLP ρ, and AOLP ϕ at each pixel requires 3 or more polarization raw frames of a scene taken behind polarizing filters (or polarizers) at different angles, $\phi_{pol}$ (e.g., because there are three unknown values to be determined: intensity I, DOLP ρ, and AOLP ϕ. For example, the FLIR® Blackfly® S Polarization Camera described above captures polarization raw frames with polarization angles $\phi_{pol}$ at 0 degrees, 45 degrees, 90 degrees, or 135 degrees, thereby producing four polarization raw frames $I_{\phi_{pol}}$, denoted herein as $I_0$, $I_{45}$, $I_{90}$, and $I_{135}$.

The relationship between $I_{\phi_{pol}}$ and intensity I, DOLP ρ, and AOLP ϕ at each pixel can be expressed as:

$$I_{\phi_{pol}} = I(1 + \rho \cos(2(\phi - \phi_{pol}))) \quad (1)$$

Accordingly, with four different polarization raw frames $I_{\phi_{pol}}$ ($I_0$, $I_{45}$, $I_{90}$, and $I_{135}$), a system of four equations can be used to solve for the intensity I, DOLP ρ, and AOLP ϕ.

Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the ϕ and ρ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (2)$$

$$\phi = \theta_a \quad (3)$$

and when the specular reflection is dominant:

$$\rho = \frac{2\sin^2\theta_z \cos\theta_z \sqrt{n^2 - \sin^2\theta_z}}{n^2 - \sin^2\theta_z - n^2\sin^2\theta_z + 2\sin^4\theta_z} \quad (4)$$

$$\phi = \theta_a - \frac{\pi}{2} \quad (5)$$

Note that in both cases ρ increases exponentially as $\theta_z$ increases and if the refractive index is the same, specular reflection is much more polarized than diffuse reflection.

Accordingly, some aspects of embodiments of the present disclosure relate to applying SfP theory to detect the shapes of surfaces (e.g., the orientation of surfaces) based on the raw polarization frames 18 of the surfaces. This approach enables the shapes of objects to be characterized without the use of other computer vision techniques for determining the shapes of objects, such as time-of-flight (ToF) depth sensing and/or stereo vision techniques, although embodiments of the present disclosure may be used in conjunction with such techniques.

More formally, aspects of embodiments of the present disclosure relate to computing first tensors 50 in first representation spaces, including extracting first tensors in polarization representation spaces such as forming polarization images (or extracting derived polarization feature maps) in operation 650 based on polarization raw frames captured by a polarization camera 10.

Light rays coming from a transparent objects have two components: a reflected portion including reflected intensity $I_r$, reflected DOLP $\rho_r$, and reflected AOLP $\phi_r$ and the refracted portion including refracted intensity $I_t$, refracted DOLP $\rho_t$, and refracted AOLP $\phi_t$. The intensity of a single pixel in the resulting image can be written as:

$$I = I_r + I_t \quad (6)$$

When a polarizing filter having a linear polarization angle of $\phi_{pol}$ is placed in front of the camera, the value at a given pixel is:

$$I_{\phi_{pol}} = I_r(1 + \rho_r \cos(2(\phi_r - \phi_{pol}))) + I_t(1 + \rho_t \cos(2(\phi_t - \phi_{pol}))) \quad (7)$$

Solving the above expression for the values of a pixel in a DOLP ρ image and a pixel in an AOLP ϕ image in terms of $I_r$, $\rho_r$, $\phi_r$, $I_t$, $\rho_t$, and $\phi_t$:

$$\rho = \frac{\sqrt{(I_r\rho_r)^2 + (I_t\rho_t)^2 + 2I_t\rho_t I_r\rho_r \cos(2(\phi_r - \phi_t))}}{I_r + I_t} \quad (8)$$

$$\phi = \arctan\left(\frac{I_r\rho_r\sin(2(\phi_r + \phi_t))}{I_t\rho_t + I_r\rho_r\cos(2(\phi_r - \phi_t))}\right) + \phi_r \quad (9)$$

Accordingly, equations (7), (8), and (9), above, provide a model for forming first tensors 50 in first representation spaces that include an intensity image I, a DOLP image ρ, and an AOLP image according to one embodiment of the present disclosure, where the use of polarization images or tensor in polarization representation spaces (including DOLP image ρ and an AOLP image ϕ based on equations (8) and (9)) enables the reliable detection of optically challenging surface characteristics of objects that are generally not detectable by comparative systems that use only intensity I images as input.

In more detail, first tensors in polarization representation spaces (among the derived feature maps 50) such as the polarization images DOLP ρ and AOL ϕ can reveal surface characteristics of objects that might otherwise appear textureless in an intensity I domain. A transparent object may have a texture that is invisible in the intensity domain I because this intensity is strictly dependent on the ratio of $I_r/I_t$ (see equation (6)). Unlike opaque objects where $I_t = 0$, transparent objects transmit most of the incident light and only reflect a small portion of this incident light. As another example, thin or small deviations in the shape of an otherwise smooth surface (or smooth portions in an otherwise rough surface) may be substantially invisible or have low contrast in the intensity I domain (e.g., a domain in which polarization of light is not taken into account), but may be very visible or may have high contrast in a polarization representation space such as DOLP ρ or AOLP ϕ.

As such, one exemplary method to acquire surface topography is to use polarization cues in conjunction with geometric regularization. The Fresnel equations relate the AOLP ϕ and the DOLP ρ with surface normals. These equations can be useful for anomaly detection by exploiting what is known as polarization patterns of the surface. A polarization pattern is a tensor of size [M, N, K] where M and N are horizontal and vertical pixel dimensions, respectively, and where K is the polarization data channel, which can vary in size. For example, if circular polarization is ignored and only linear polarization is considered, then K would be equal to two, because linear polarization has both an angle and a degree of polarization (AOLP ϕ and DOLP ρ). Analogous to a Moire pattern, in some embodiments of the present disclosure, the feature extraction module 700 extracts a polarization pattern in polarization representation spaces (e.g., AOLP space and DOLP space). In the example characterization output 20 shown in FIG. 1A and FIG. 1B shown above, the horizontal and vertical dimensions correspond to the lateral field of view of a narrow strip or patch of the surface 2 captured by the polarization camera 10. However, this is one exemplary case: in various embodiments, the strip or patch of the surface may be vertical (e.g., much taller than wide), horizontal (e.g., much wider than tall), or have a more conventional field of view (FoV) that tends closer toward a square (e.g., a 4:3 ratio or 16:9 ratio of width to height).

While the preceding discussion provides specific examples of polarization representation spaces based on linear polarization in the case of using a polarization camera having one or more linear polarizing filters to capture polarization raw frames corresponding to different angles of linear polarization and to compute tensors in linear polarization representation spaces such as DOLP and AOLP, embodiments of the present disclosure are not limited thereto. For example, in some embodiments of the present disclosure, a polarization camera includes one or more circular polarizing filters configured to pass only circularly polarized light, and where polarization patterns or first tensors in circular polarization representation space are further extracted from the polarization raw frames. In some embodiments, these additional tensors in circular polarization representation space are used alone, and in other embodiments they are used together with the tensors in linear polarization representation spaces such as AOLP and DOLP. For example, a polarization pattern including tensors in polarization representation spaces may include tensors in circular polarization space, AOLP, and DOLP, where the polarization pattern may have dimensions [M, N, K], where K is three to further include the tensor in circular polarization representation space.

Figure 4:
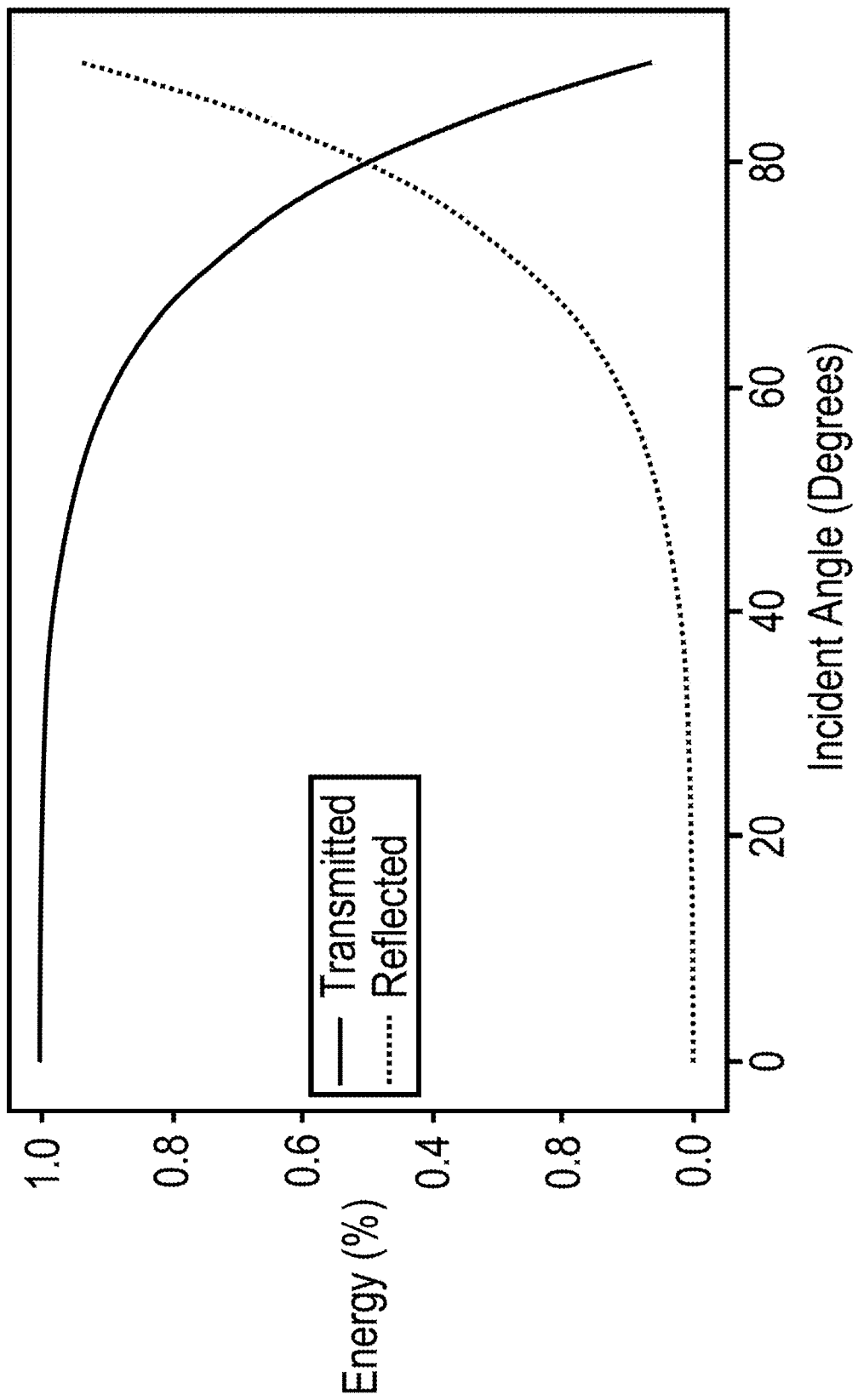
FIG. 4 is a graph of the energy of light that is transmitted versus reflected over a range of incident angles to a surface having a refractive index of approximately 1.5.

FIG. 4 is a graph of the energy of light that is transmitted versus reflected over a range of incident angles to a surface having a refractive index of approximately 1.5. As shown in FIG. 4, the slopes of the transmitted energy (shown in FIG. 4 with a solid line) and reflected energy (shown in FIG. 4 with a dotted line) lines are relatively small at low incident angles (e.g., at angles closer to perpendicular to the plane of the surface). As such, small differences in the angle of the surface may be difficult to detect (low contrast) in the polarization pattern when the angle of incidence is low (e.g., close to perpendicular to the surface, in other words, close to the surface normal). On the other hand, the slope of the reflected energy increases from flat, as the angle of incidence increases, and the slope of the transmitted energy decreases from flat (to have a larger absolute value) as the angle of incidence increases. In the example shown in FIG. 4 with an index of refraction of 1.5, the slopes of both lines are substantially steeper beginning at an incident angle of around 60°, and their slopes are very steep at an incident angle of around 80°. The particular shapes of the curves may change for different materials in accordance with the refractive index of the material. Therefore, capturing images of surfaces under inspection at incident angles corresponding to steeper portions of the curves (e.g., angles close to parallel to the surface, such as around 80° in the case of a refractive index of 1.5, as shown in FIG. 4) can improve the contrast and detectability of variations in the surface shapes in the polarization raw frames 18 and may improve the detectability of such features in tensors in polarization representation spaces, because small changes in incident angle (due to the small changes in the surface normal) can cause large changes in the captured polarization raw frames.

Accordingly, some aspects of embodiments of the present disclosure relate to supplying first tensors in the first representation spaces (e.g., including feature maps in polarization representation spaces) extracted from polarization raw frames as inputs to a predictor for computing or detecting surface characteristics of transparent objects and/or other optically challenging surface characteristics of objects under inspection. These first tensors may include derived feature maps which may include an intensity feature map I, a degree of linear polarization (DOLP) ρ feature map, and an angle of linear polarization (AOLP) ϕ feature map, and where the DOLP ρ feature map and the AOLP ϕ feature map are examples of polarization feature maps or tensors in polarization representation spaces, in reference to feature maps that encode information regarding the polarization of light detected by a polarization camera. In some embodiments, the feature maps or tensors in polarization representation spaces are supplied as input to, for example, detection algorithms that make use of SfP theory to characterize the shape of surfaces of objects imaged by the polarization cameras 10.

Surface Characterization Based on Polarization Features

As shown above in FIGS. 1A and 1B, aspects of embodiments of the present invention relate to systems and methods for performing surface characterization of objects under inspection by capturing images of surfaces of objects 1 using one or more polarization cameras 10 that capture polarization raw frames 18 that are analyzed by a processing system or processing circuit 100. The characterization of the surfaces may include detecting surface characteristics that are optically challenging, e.g., surface characteristics that may be difficult or impossible to detect using comparative computer vision or machine vision techniques that do not use polarization information. While some aspects of embodiments of the present disclosure relate to surface characteristics that correspond to defects in manufactured products (e.g., defects such as cracks, tears, uneven application of paints or dyes, the presence of surface contaminants, unintentional surface irregularities or other geometric deviations from reference models, and the like), embodiments of the present disclosure are not limited thereto and may be applied to detecting other surface characteristics such as detecting the locations boundaries between different types of materials, measuring the uniformity of the refractive index of a material across an area, characterizing geometry of surface treatments applied to portions of materials (e.g., the etching of materials and/or the depositing of materials onto surfaces), and the like.

Figure 5:
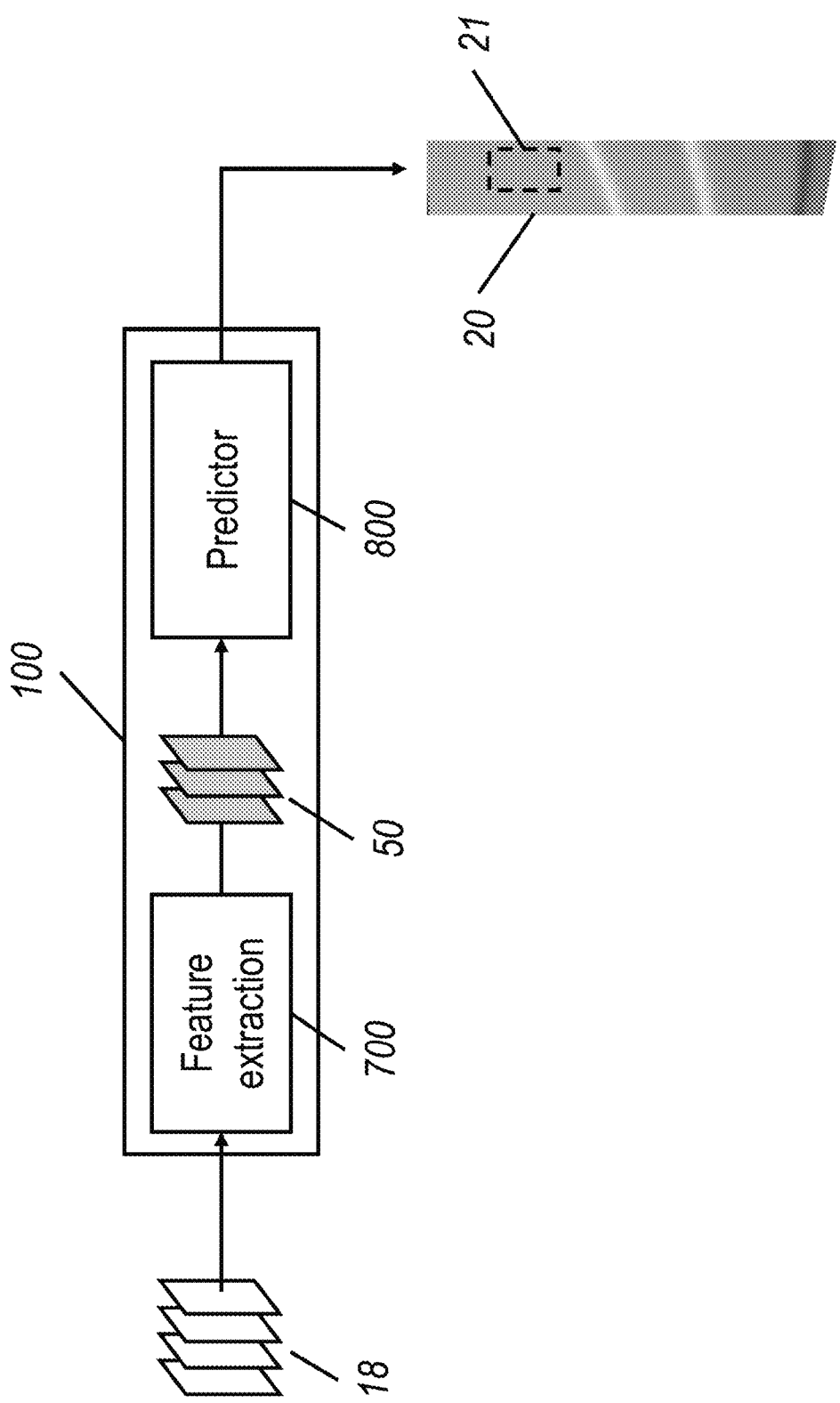
FIG. 5 is a block diagram of processing circuit 100 for computing surface characterization outputs based on polarization data according to one embodiment of the present invention.
Figure 6:
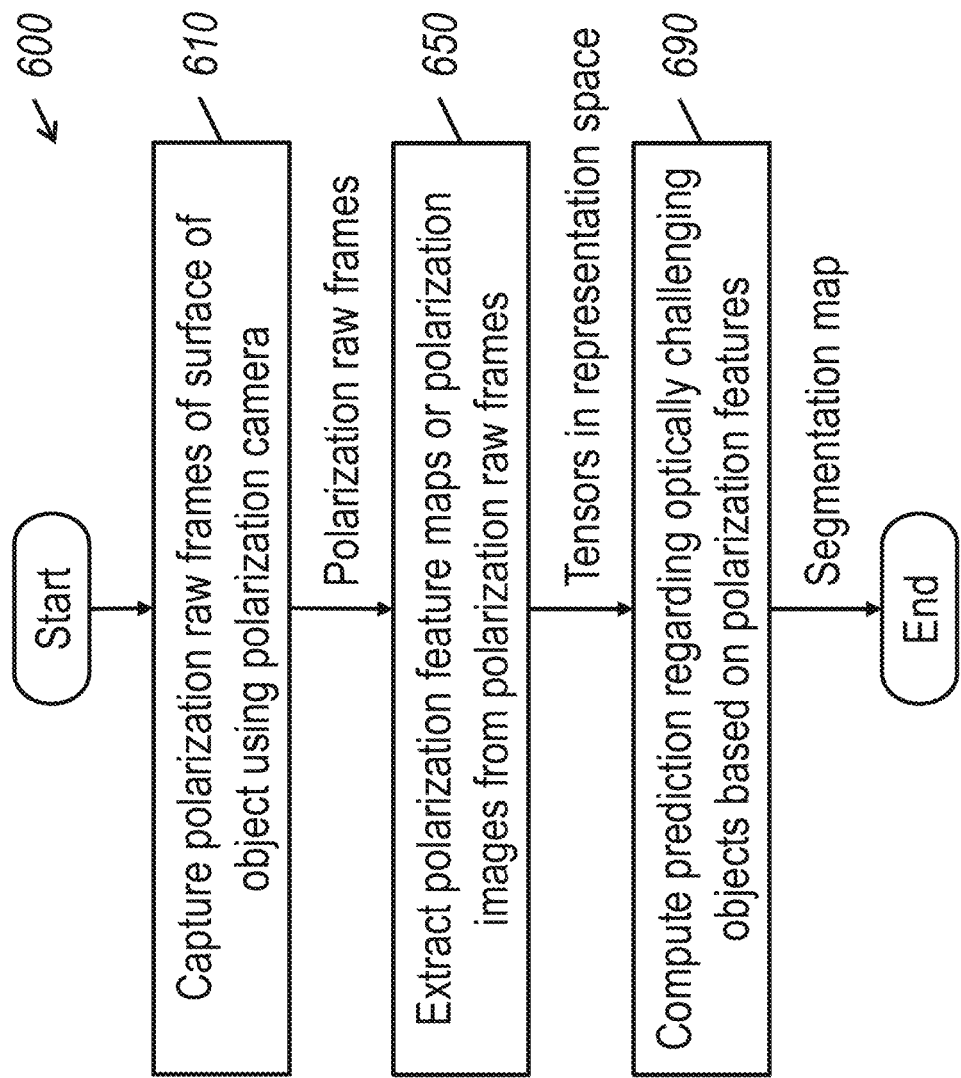
FIG. 6 is a flowchart of a method for performing surface characterization based on input images to compute a surface characterization output according to one embodiment of the present invention.

FIG. 5 is a block diagram of processing circuit 100 for computing surface characterization outputs based on polarization data according to one embodiment of the present invention. FIG. 6 is a flowchart of a method 600 for performing surface characterization based on input images to compute a surface characterization output according to one embodiment of the present invention.

According to various embodiments of the present disclosure, the processing circuit 100 is implemented using one or more electronic circuits configured to perform various operations as described in more detail below. Types of electronic circuits may include a central processing unit (CPU), a graphics processing unit (GPU), an artificial intelligence (AI) accelerator (e.g., a vector processor, which may include vector arithmetic logic units configured efficiently perform operations common to neural networks, such dot products and softmax), a field programmable gate array (FPGA), an application specific integrated circuit (ASIC), a digital signal processor (DSP), or the like. For example, in some circumstances, aspects of embodiments of the present disclosure are implemented in program instructions that are stored in a non-volatile computer readable memory where, when executed by the electronic circuit (e.g., a CPU, a GPU, an AI accelerator, or combinations thereof), perform the operations described herein to compute a characterization output 20 from input polarization raw frames 18. The operations performed by the processing circuit 100 may be performed by a single electronic circuit (e.g., a single CPU, a single GPU, or the like) or may be allocated between multiple electronic circuits (e.g., multiple GPUs or a CPU in conjunction with a GPU). The multiple electronic circuits may be local to one another (e.g., located on a same die, located within a same package, or located within a same embedded device or computer system) and/or may be remote from one other (e.g., in communication over a network such as a local personal area network such as Bluetooth®, over a local area network such as a local wired and/or wireless network, and/or over wide area network such as the internet, such a case where some operations are performed locally and other operations are performed on a server hosted by a cloud computing service). One or more electronic circuits operating to implement the processing circuit 100 may be referred to herein as a computer or a computer system, which may include memory storing instructions that, when executed by the one or more electronic circuits, implement the systems and methods described herein.

As shown in FIG. 5, in some embodiments, a processing circuit 100 includes a feature extractor or feature extraction system 700 and a predictor 800 (e.g., a classical computer vision prediction algorithm and/or a trained statistical model such as a trained neural network) configured to compute a prediction output 20 (e.g., a statistical prediction) regarding surface characteristics of objects based on the output of the feature extraction system 700. While some embodiments of the present disclosure are described herein in the context of a surface characterization system for detecting defects in the surfaces of manufactured objects, where those surface defects may be optically challenging to detect, embodiments of the present disclosure are not limited thereto. For example, some aspects of embodiments of the present disclosure may be applied to techniques for characterizing the surfaces of objects made of materials or have surface characteristics that are optically challenging to detect, such as surfaces of translucent objects, multipath inducing objects, objects that are not entirely or substantially matte or Lambertian, and/or very dark objects. These optically challenging objects include objects and surface characteristics thereof that are difficult to resolve or detect through the use of images that are capture by camera systems that are not sensitive to the polarization of light (e.g., based on images captured by cameras without a polarizing filter in the optical path or where different images do not capture images based on different polarization angles). For example, these surface characteristics may have surface appearances or colors that are very similar to the surfaces on which the characteristics appear (e.g., dents have the same color as the underlying material and scratches on transparent materials such as glass may also be substantially transparent). In addition, while embodiments of the present disclosure are described herein in the context of detecting optically challenging surface characteristics, embodiments of the present disclosure are not limited to detecting only optically challenging surface defects. For example, in some embodiments, a predictor 800 is configured (e.g., a statistical model is trained using training data) to detect both surface characteristics that are optically challenging as well as surface characteristics that are robustly detectable without using polarization information.

Polarization may be used to detect surface characteristics or features that would otherwise be optically challenging when using intensity information (e.g., color intensity information) alone. For example, polarization information can detect changes in geometry and changes in material in the surfaces of objects. The changes in material (or material changes), such as boundaries between different types of materials (e.g., a black metallic object on a black road or a colorless liquid on a surface may both be substantially invisible in color space, but would both have corresponding polarization signatures in polarization space), may be more visible in polarization space because differences in the refractive indexes of the different materials cause changes in the polarization of the light. Likewise, differences in the specularity of various materials cause different changes in the polarization phase angle of rotation, also leading to detectable features in polarization space that might otherwise be optically challenging to detect without using a polarizing filter. Accordingly, this causes contrast to appear in images or tensors in polarization representation spaces, where corresponding regions of tensors computed in intensity space (e.g., color representation spaces that do not account for the polarization of light) may fail to capture these surface characteristics (e.g., where these surface characteristics have low contrast or may be invisible in these spaces). Examples of optically challenging surface characteristics include: the particular shapes of the surfaces (e.g., degree of smoothness and deviations from ideal or acceptable physical design tolerances for the surfaces); surface roughness and shapes of the surface roughness patterns (e.g., intentional etchings, scratches, and edges in the surfaces of transparent objects and machined parts), burrs and flash at the edges of machined parts and molded parts; and the like. Polarization would also be useful to detect objects with identical colors, but differing material properties, such as scattering or refractive index.

As shown in FIG. 6 and referring, for example, to FIG. 1B, in operation 610 the processing circuit 100 captures polarization raw frames 18 of a surface 2 of an object under inspection 1. For example, in some embodiments, the processing circuit 100 controls one or more polarization cameras 10 to capture polarization raw frames 18 depicting a particular surface 2 of the object. In various embodiments of the present disclosure, the capture of particular surfaces of the object under inspection may be triggered using one or more detection systems, such as a mechanical switch trigger (e.g. when a portion of the object or a conveyor system closes an electronic switch to signal the current location of the object), a laser trigger (e.g., when a portion of the object 1 blocks a laser beam from reaching a detector), or an optical trigger (e.g., a camera system detects the presence of the object at a particular location).

Referring back to FIG. 1A, a polarization-enhanced imaging system or surface characterization system according to embodiments of the present disclosure may use polarization cameras 10 mounted either on a gantry located around the conveyor belt or on the end-effector of robotic arms, which can be used to provide patch-based images of the object 1 (e.g., images or patches or strips of surfaces of the object 1) as the object 1 moves on the conveyor belt. In some embodiments of the present disclosure, polarization cameras 10 attached to the movable mounts are automatically repositioned by the system to place the polarization cameras 10 in poses such that the incident angle of the light on the surface is in the steeper or higher contrast portion of the curves shown in FIG. 4 (e.g., based on the general orientations of the surface under inspection and the light sources in the scene). In some embodiments of the present disclosure, illumination sources (e.g., running lights or flashes) may also be placed in fixed locations or attached to the movable mounts (e.g., either rigidly attached to a corresponding polarization camera or attached to an independently movable moveable mount) to illuminate the surfaces of the object with light at an incident angle that makes the surface shape features of the object more easily detectable (e.g., at high incident angles).

Accordingly, in some embodiments of the present disclosure, capturing the polarization raw frames 18 of a surface 2 of the object under inspection 1 in operation 610 includes moving polarization cameras 10 and/or illumination sources to poses with respect to the surface 2 under inspection in accordance with particular characteristics of the surface 2 to be characterized. For example, in some embodiments, this involves automatically positioning the polarization cameras 10 and/or illumination sources such that light from the illumination sources strikes the surface 2 at a high incident angle (e.g., around 80 degrees). In some embodiments of the present disclosure, the particular positions at which high incident angles may be feasible will vary based on the particular shapes of the surfaces to be inspected (e.g., the design of a door of a car may include different portions with significantly different surface normals, such as an indentation at the door handle, edges where the door meets the window, and indentations in the main surface of the door for style and/or aerodynamics).

In some embodiments of the present disclosure, the processing circuit 100 loads a profile associated with the type or class of object under inspection, where the profile includes a collection of one or more poses for the polarization camera 10 to be moved to in relation to the object under inspection 1. Different types or classes of objects having different shapes may be associated with different profiles, while manufactured objects of the same type or class are expected to have the same shape. (For example, different models of vehicles may have different shapes, and these different models of vehicles may be mixed in an assembly line. Accordingly, the processing circuit 100 may select, from a collection of different profiles, a profile corresponding to the type of vehicle currently under inspection.) Accordingly, the polarization camera 10 may be automatically moved through a sequence of poses stored in the profile to capture polarization raw frames 18 of the surfaces of the object under inspection 1.

In the embodiment shown in FIGS. 5 and 6, in operation 650, the feature extraction system 700 of the processing circuit 100 extracts one or more first feature maps 50 in one or more first representation spaces (including polarization images or polarization feature maps in various polarization representation spaces) from the input polarization raw frames 18 of a scene.

Figure 7A:
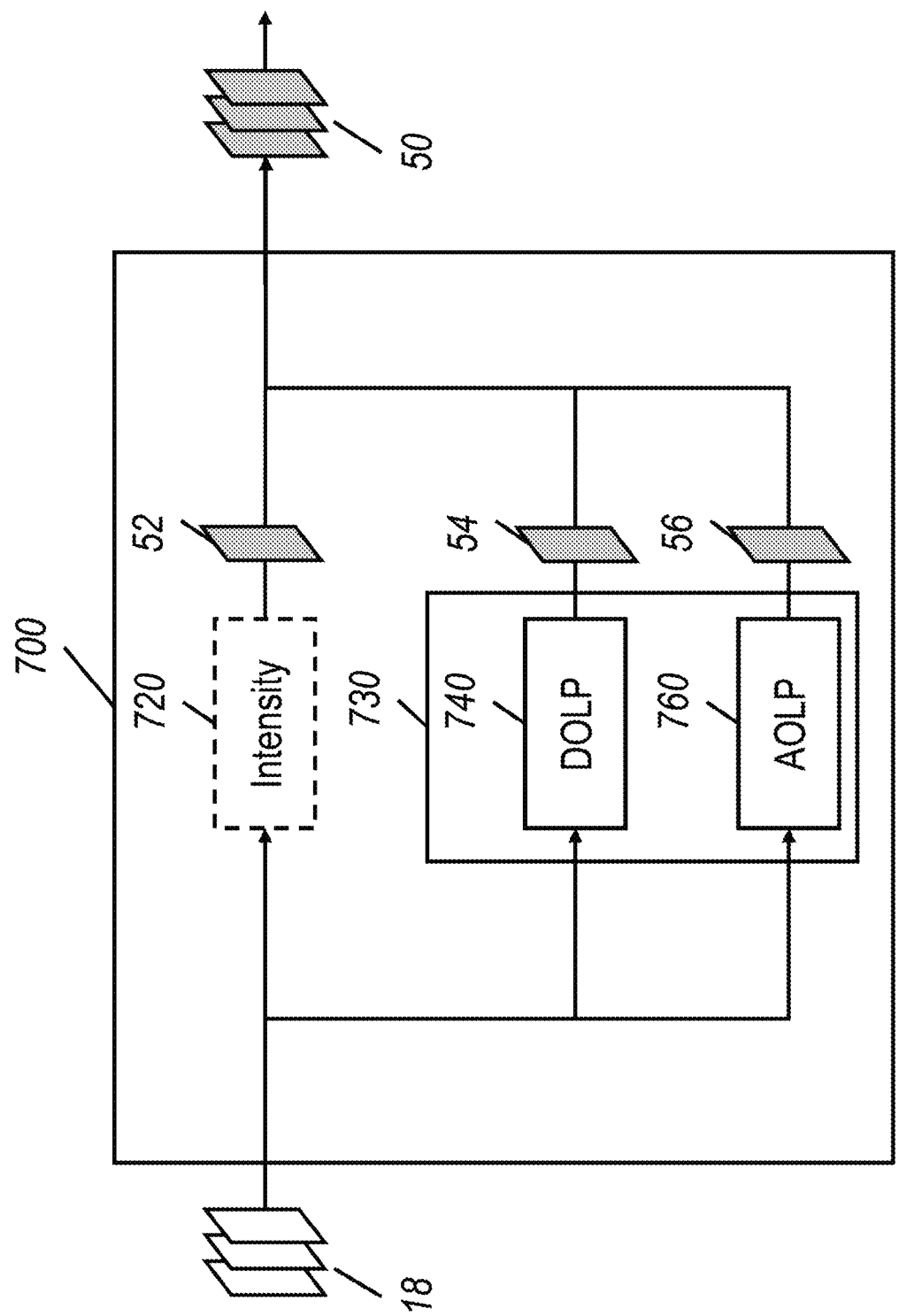
FIG. 7A is a block diagram of a feature extractor according to one embodiment of the present invention.
Figure 7B:
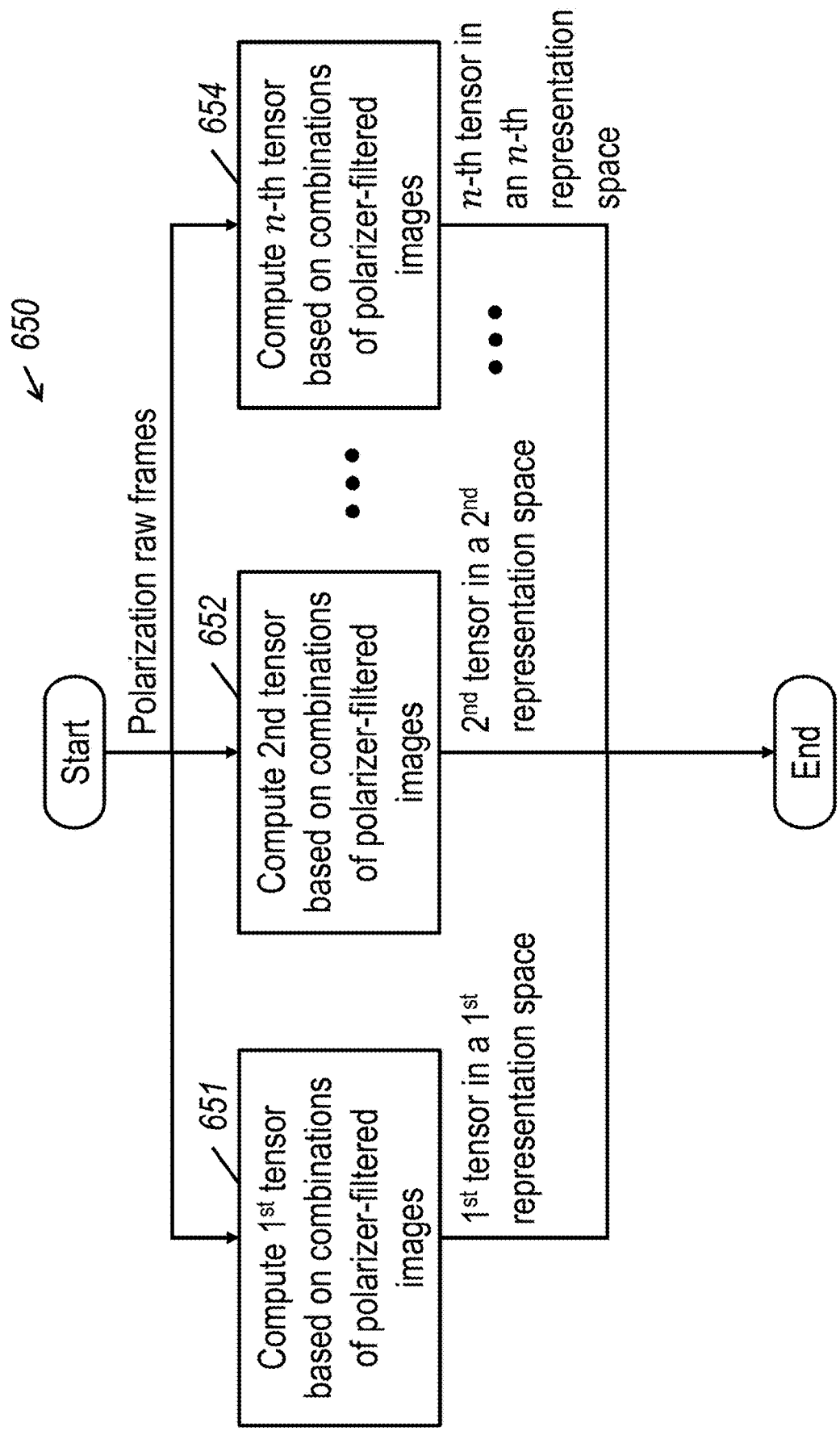
FIG. 7B is a flowchart depicting a method according to one embodiment of the present invention for extracting features from polarization raw frames.

FIG. 7A is a block diagram of a feature extractor 700 according to one embodiment of the present invention. FIG. 7B is a flowchart depicting a method according to one embodiment of the present invention for extracting features from polarization raw frames. In the embodiment shown in FIG. 7A, the feature extractor 700 includes an intensity extractor 720 configured to extract an intensity image I 52 in an intensity representation space (e.g., in accordance with equation (7), as one example of a non-polarization representation space) and polarization feature extractors 730 configured to extract features in one or more polarization representation spaces. In some embodiments of the present disclosure, the intensity extractor 720 is omitted and the feature extractor does not extract an intensity image 152.

As shown in FIG. 7B, the extraction of polarization images in operation 650 may include extracting, in operation 651, a first tensor in a first polarization representation space from the polarization raw frames from a first Stokes vector. In operation 652, the feature extractor 700 further extracts a second tensor in a second polarization representation space from the polarization raw frames. For example, the polarization feature extractors 730 may include a DOLP extractor 740 configured to extract a DOLP $\rho$ image 54 (e.g., a first polarization image or a first tensor in accordance with equation (8) with DOLP as the first polarization representation space) and an AOLP extractor 760 configured to extract an AOLP $\phi$ image 56 (e.g., a second polarization image or a second tensor in accordance with equation (9), with AOLP as the second polarization representation space) from the supplied polarization raw frames 18. In addition, in various embodiments, the feature extraction system 700 extracts two or more different tensors (e.g., n different tensors) in two or more representation spaces (e.g., n representation spaces), where the n-th tensor is extracted in operation 614. As discussed above, in some embodiments of the present disclosure, the polarization feature extractors 730 extracts polarization features in polarization representation spaces including both linear polarization representation spaces (e.g., tensors in the aforementioned AOLP and DOLP representation spaces extracted from polarization raw frames captured with a linear polarizing filter) and circular polarization representation spaces (e.g., tensors extracted from polarization raw frames captured with a circular polarizing filter). In various embodiments, the representation spaces include, but are not limited to, polarization representation spaces.

The polarization representation spaces may include combinations of polarization raw frames in accordance with Stokes vectors. As further examples, the polarization representations may include modifications or transformations of polarization raw frames in accordance with one or more image processing filters (e.g., a filter to increase image contrast or a denoising filter). The feature maps 52, 54, and 56 in first polarization representation spaces may then be supplied to a predictor 800 for detecting surface characteristics based on the feature maps 50.

While FIG. 7B illustrates a case where two or more different tensors are extracted from the polarization raw frames 18 in more than two different representation spaces, embodiments of the present disclosure are not limited thereto. For example, in some embodiments of the present disclosure, exactly one tensor in a polarization representation space is extracted from the polarization raw frames 18. For example, one polarization representation space of raw frames is AOLP ϕ and another is DOLP ρ (e.g., in some applications, AOLP may be sufficient for detecting surface characteristics of transparent objects or surface characteristics of other optically challenging objects such as translucent, non-Lambertian, multipath inducing, and/or non-reflective objects).

Accordingly, extracting features such as polarization feature maps or polarization images from polarization raw frames 18 produces first tensors 50 from which optically challenging surface characteristics may be detected from images of surfaces of objects under inspection. In some embodiments, the first tensors extracted by the feature extractor 700 may be explicitly derived features (e.g., hand crafted by a human designer) that relate to underlying physical phenomena that may be exhibited in the polarization raw frames (e.g., the calculation of AOLP and DOLP images in linear polarization spaces and the calculation of tensors in circular polarization spaces, as discussed above). In some additional embodiments of the present disclosure, the feature extractor 700 extracts other non-polarization feature maps or non-polarization images, such as intensity maps for different colors of light (e.g., red, green, and blue light) and transformations of the intensity maps (e.g., applying image processing filters to the intensity maps). In some embodiments of the present disclosure the feature extractor 700 may be configured to extract one or more features that are automatically learned (e.g., features that are not manually specified by a human) through an end-to-end supervised training process based on labeled training data. In some embodiments, these learned feature extractors may include deep convolutional neural networks, which may be used in conjunction with traditional computer vision filters (e.g., a Haar wavelet transform, a Canny edge detector, and the like).

Surface Characterization Based on Tensors in Representation Spaces Including Polarization Representation Spaces The feature maps in first representation space 50 (including polarization images) extracted by the feature extraction system 700 are provided as input to the predictor 800 of the processing circuit 100, which implements one or more prediction models to compute, in operation 690, a surface characterization output 20.

In the case where the predictor 800 is a defect detection system, the prediction may be an image 20 (e.g., an intensity image) of the surface 2, where a portion of the image is marked 21 or highlighted as containing a defect. In some embodiments, the output of the defect detection system is a segmentation map, where each pixel may be associated with one or more confidences that the pixel corresponds to a location of various possible classes (or types) of surface characteristics (e.g., defects) that may be found in objects that the surface characterization system is trained to inspect, or a confidence that the pixel corresponds to an anomalous condition in the image of the surface of the object under inspection. In the case where the predictor is a classification system, the prediction may include a plurality of classes and corresponding confidences that the image depicts an instance of each of the classes (e.g. that the image depicts various types of defects or different types of surface characteristics such as smooth glass, etched glass, scratched glass, and the like). In the case where the predictor 800 is a classical computer vision prediction algorithm, the predictor may compute a detection result (e.g., detect defects by comparing the extracted feature maps in first representation space to model feature maps in the first representation space or identify edges or regions with sharp or discontinuous changes in the feature map in areas that are expected to be smooth).

In the embodiment shown in FIG. 5, the predictor 800 implements a defect detection system and computes, in operation 690, a surface characterization output 20 that includes a location of a detected defect, which is computed based on the extracted first tensors 50 in first representation spaces, extracted from the input polarization raw frames 18. As noted above, the feature extraction system 700 and the predictor 800 are implemented using one or more electronic circuits that are configured to perform their operations, as described in more detail below.

According to various embodiments of the present disclosure, the surface 2 of the object 1 as imaged by the one or more polarization cameras 10 is characterized in accordance with a model associated with the surface. The particular details of the surface characterization performed by a surface characterization system according to embodiments of the present invention depend on the particular application and the surfaces being characterized.

Continuing the above example of the detection of defects on the surfaces of an automobile, different types of defects may appear on different surfaces of the automobile, due to the locations and methods of manufacturing the various parts and due to the types of materials used in the different parts. For example, painted metal door panels may exhibit different types of defects (e.g., scratches, dents) than glass windows (e.g., scratches, chips, and cracks), which may exhibit defects that are different from those found in plastic components (e.g., headlight covers, which may also show scratches, chips, and cracks, but may also contain expected and intentional surface irregularities, including such as surface ridges and bumps and ejector pin marks).

As another example, in a machined, metal part, some surfaces may be expected to be smooth and glossy, while other surfaces may be expected to be rough or to have particular physical patterns (e.g., patterns of grooves, bumps, or random textures), where different surfaces of the machined part may have different tolerances.

Figure 8A:
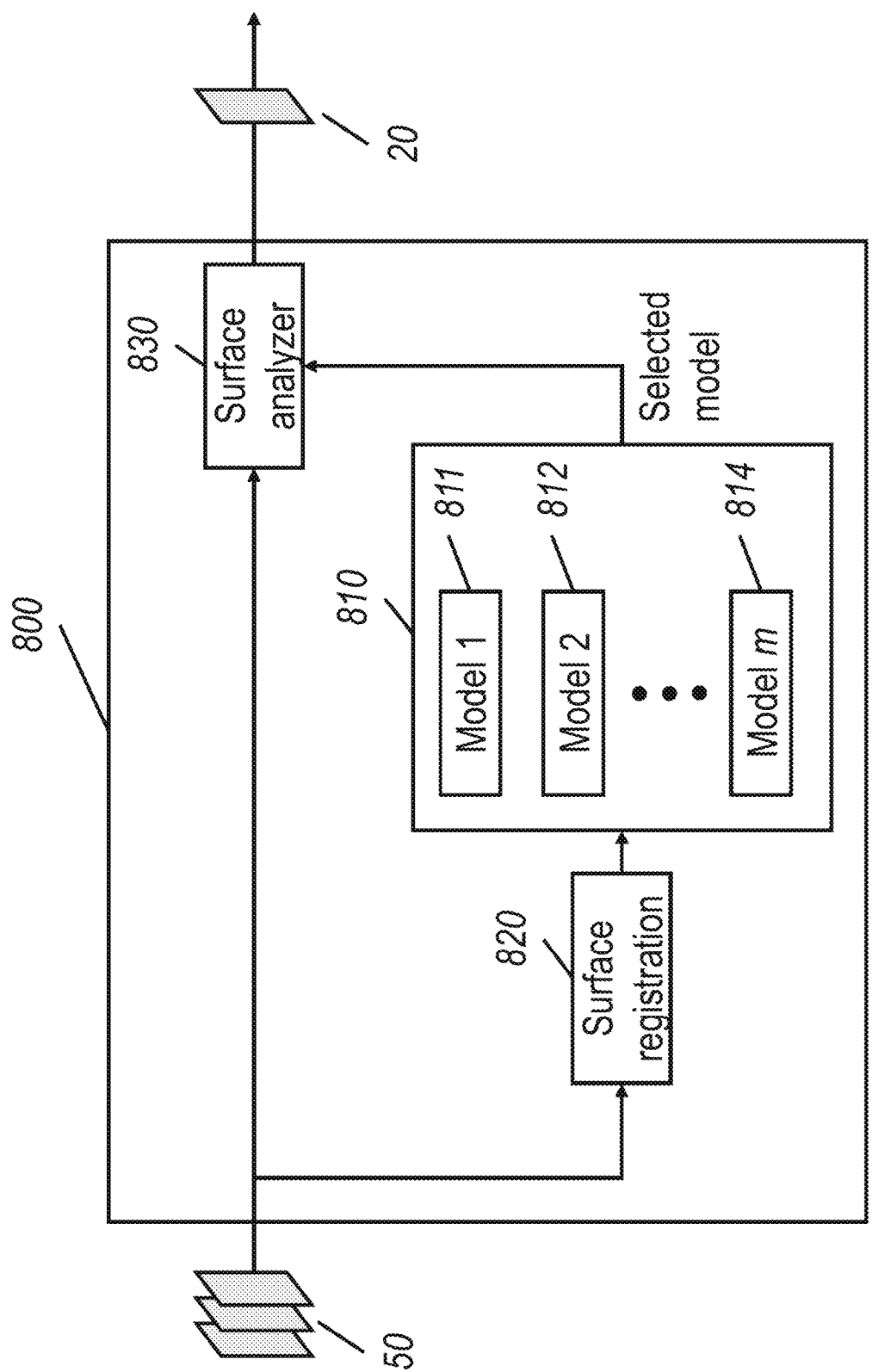
FIG. 8A is a block diagram of a predictor according to one embodiment of the present invention.

FIG. 8A is a block diagram of a predictor according to one embodiment of the present invention. As shown in FIG. 8A, a predictor 800 receives input tensors in first representation spaces 50. The predictor 800 may include a collection of models 810 associated with different types of surfaces that are expected to be analyzed by the surface characterization system. In the embodiment shown in FIG. 8A, the predictor 800 has access to m different models (e.g., different models stored in the memory of the processing circuit 100). For example, a first model 811 may be associated with main surfaces of door panels, a second model 812, may be associated with the handle portion of a door panel, and an m-th model 814 may be associated with a tail light.

Figure 8B:
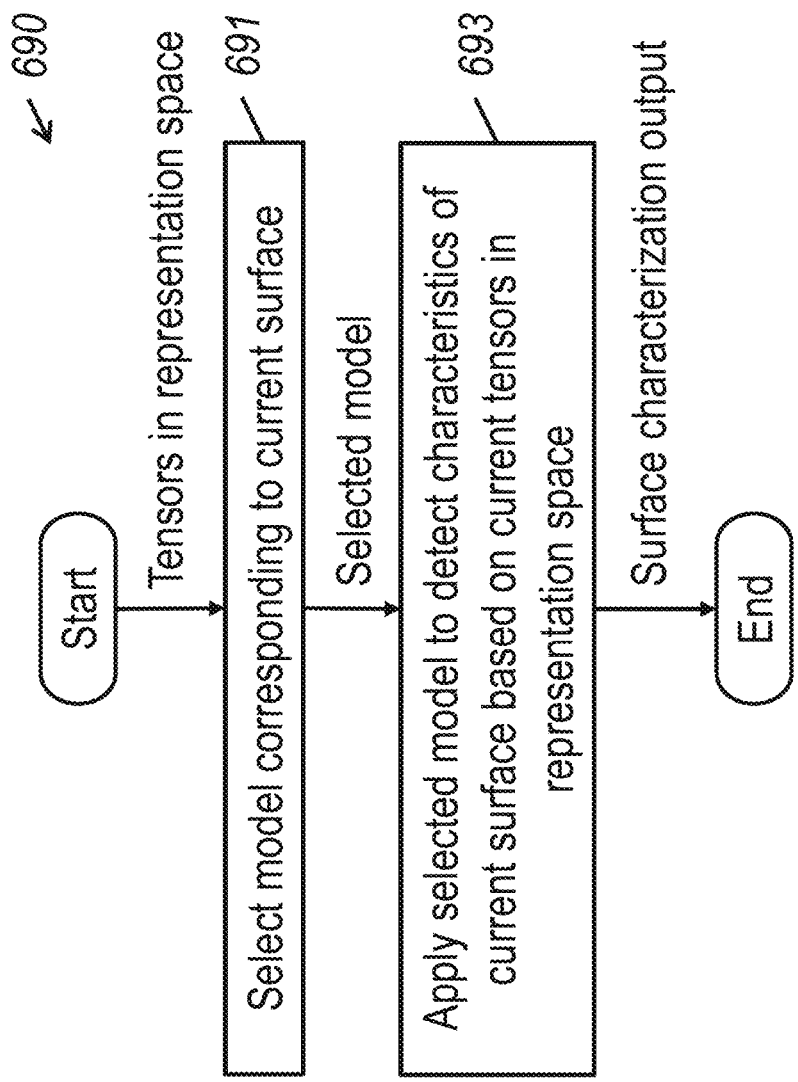
FIG. 8B is a flowchart depicting a method according to one embodiment of the present invention for detecting characteristics of surfaces of objects.

FIG. 8B is a flowchart depicting a method 690 according to one embodiment of the present invention for detecting characteristics of surfaces of objects. In operation 691, the processing system 100 selects a model, from among the collection of models 810, that corresponds to the current surface. In some embodiments, the particular model is selected based on metadata stored in the profile associated with the object under inspection 1 and associated with the particular pose at which the polarization raw frames 18 were captured by the polarization camera 10.

In some embodiments of the present disclosure the orientation of the objects under inspection is consistent from one object to the next. For example, in the case of automobile manufacturing, each assembled automobile may move along the conveyor system with its nose leading (e.g. as opposed to some moving with the drivers' side leading and some with the rear of the vehicle leading). Accordingly, images of different surfaces of the object under inspection 1 may be reliably captured based on known information about the position of the automobile on the conveyor system and its speed. For example, a camera located at a particular height on the drivers' side of the automobile may expect to image a particular portion of the bumper, the fender, the wheel wells, the drivers' side door, the quarter panel, and the rear bumper of the car. Based on the speed of the conveyor system and a triggering time at which the automobile enters the field of view of the surface characterization system, various surfaces of the automobile will be expected to be imaged at different times, in accordance with a profile associated with the type of the object (e.g., the type, class, or model of the car).

In some embodiments, the orientations of the objects under inspection may be inconsistent, and therefore a separate registration process may be employed to determine which surfaces are being imaged by the polarization cameras 10. In these embodiments, the profile may include a three-dimensional (3-D) model of the object under inspection (e.g., a computer aided design or CAD model of the physical object or three-dimensional mesh or point cloud model). Accordingly, in some embodiments, a simultaneous location and mapping (SLAM) algorithm is applied to determine which portions of object under inspection are being imaged by the polarization cameras 10 and to use the determined locations to identify corresponding locations on the 3-D model, thereby enabling a determination of which surfaces of the 3-D model were imaged by the polarization cameras 10. For example, keypoint detection algorithms may be used to detect unique parts of the object, and the keypoints are used to match the orientation of the 3-D model to the orientation of the physical object under inspection 1.

As such, in some embodiments of the present disclosure, a surface registration module 820 of the prediction system 800 registers the polarization raw frames 18 captured by the polarization cameras (and/or the tensors in representation spaces 50) with particular portions of the object under inspection based on a profile associated with the object to select a model associated with the current surface imaged by the polarization raw frames 18 from a collection of models 810.

In operation 693, the processing system applies the selected model using the surface analyzer 830 to compute the surface characterization output 20 for the current surface. Details of the various types of models and the particular operations performed by the surface analyzer 830 based on these different types of models according to various embodiments of the present disclosure will be described in more detail below.

Surface Characterization Through Comparison with Design Models and Representative Models In some embodiments of the present disclosure, the stored models include feature maps in representation space as computed from representative models (e.g., design models) of the objects under inspection, and the surface analyzer compares the feature maps computed from the captured polarization raw frames 18 against the stored representative (e.g., ideal) feature maps in the same representation space.

For example, as noted above, in some embodiments of the present disclosure, the representation spaces include a degree of linear polarization (DOLP) $\rho$ and an angle of linear polarization (AOLP) $\phi$. In some such embodiments, the models 810 include reference 2-D and/or 3-D models (e.g., CAD models) of the surfaces, which have their intrinsic surface normals. These intrinsic surface reference models are sometimes referred to as design surface normals and are the design targets of the surface (e.g., ideal shapes of the surface), and therefore these represent the ground truth for the patch under inspection (e.g., the patch of the surface imaged by the set of polarization raw frames 18).

In such embodiments, the feature extraction system 700 extracts surface normals using shape from polarization (SfP), and these surface normal are aligned, by the surface registration module 820, with the reference 2-D and/or 3-D models (e.g., the CAD models) of the corresponding part of surface.

In this embodiment, the surface analyzer 830 performs a comparison between the surface normals represented in the tensors in representation space 50 computed from the polarization raw frames 18 and the design surface normals from a corresponding one of the models 810 to find the regions of discrepancy whereby the different areas are identified and flagged. For example, portions of the tensors in representation spaces 50 computed from the raw polarization frames 18 that differ from the corresponding portions of the design surface normals (in the same representation spaces as the tensors 50) by more than a threshold amount are marked as discrepancies or potential defects, while other portions that differ by less than the threshold are marked as clean (e.g., not defective). In various embodiments of the present disclosure, this threshold may be set based on, for example, designed tolerances for the surface under inspection and the sensitivity of the system (e.g., in accordance with noise levels in the system, such as sensor noise in the image sensor 14 of the polarization camera 10.

In addition, given that the regions of interest have both the computed surface normals and the 3-D coordinates of the surface from the design target loaded from the selected model from the models 810, in some embodiments the surface analyzer 830 converts the regions into 3-D point clouds representing the shape of the imaged surface (e.g., using shape from polarization equations), and the surface analyzer 830 performs further inspection and analysis on the generated 3-D point clouds, such as by comparing the shapes of the 3-D point clouds to the shapes of the corresponding surfaces in the reference 3-D models. The comparison may include iteratively reorienting the point clouds to minimize the distance between the points in the point cloud and the surface of the reference 3-D models, where points of the point cloud that are more than a threshold distance away from the surface of the reference 3-D model regions of the surface under inspection that deviate from the reference model and that may correspond to geometric defects (e.g., dents, burrs, or other surface irregularities).

As another example, manufactured parts that meet the same tolerance will have substantially the same polarization patterns under similar lighting (e.g., the same polarization patterns, with variations due to the manufacturing tolerances). The polarization pattern of an ideal or expected or reference part will be referred to as a template polarization pattern or a reference tensor (which would correspond to the model selected from the set of models 810). In these embodiments, the feature extraction system 700 extracts a measured polarization pattern for a surface of an object under inspection (e.g., measured tensors in first representation spaces the AOLP and DOLP feature maps described above). If the surface of the object contained an anomaly, such as a micro-dent in the surface, this anomaly would appear in the measured polarization pattern, thereby resulting in its classification as an anomalous polarization pattern (or having a region containing an anomaly, such as region 21 shown in FIG. 1B) that differs from the template polarization pattern or reference tensors in the first representation spaces. On the other hand, a defect-free surface would generate a measured polarization pattern that matched (within tolerances) the template polarization pattern or reference tensors (e.g., when the measured polarization pattern matches, then it is classified as a clean polarization pattern).

Some aspects of embodiments of the present disclosure relate to mathematical operations for comparing the template polarization pattern and measured polarization patterns. In some embodiments, a subtraction or arithmetic difference between the template and anomalous polarization patterns is computed to compare the patterns. However, as shown in FIG. 4, the Fresnel equations model the non-linear relationship between incident angle and energy transmitted and energy reflected, where the shapes of the curves shift in accordance with refractive index (FIG. 4 shows example curves for a refractive index of 1.5). This non-linear change in energy reflected for similar changes in surface normals at different incident angles may make it difficult to perform comparisons between polarization patterns (e.g., comparing a template polarization pattern against a measured polarization pattern). For example, a 1 degree change in incident angle in the neighborhood of 60 degrees (e.g., an average incident angle of 60 degrees and a surface normal variation that caused a 0.5 degree change in incident angle to 60.5 degrees) would have a larger change in energy reflected than a similar change in the neighborhood of 10 degrees (e.g., an average incident angle of 0 degrees and a surface normal variation that caused a 0.5 degree change in incident angle to 0.5 degrees). In other words, these embodiments would use a linear metric for comparing a non-linear phenomenon, which may cause detectability problems in flatter neighborhoods of the curve (e.g., portions of the curve with a smaller first derivative) or may cause saturation or overflow of the signal in steeper neighborhoods of the curve (e.g., portions of the curve with a larger first derivative).

As such, some aspects of embodiments of the present disclosure relate to the use of Fresnel subtraction to compute a Fresnel distance for comparing a template polarization pattern and a measured polarization pattern in a manner that that accounts for the non-linear relationship between the incident angle and the energy reflected or transmitted. Accordingly, Fresnel subtraction according to some aspects of embodiments of the present disclosure is a non-linear operator that admits linear comparison of surface normals. In effect, Fresnel subtraction linearizes the curve shown in FIG. 4, enabling a relative micro-surface deviation of 30 degrees to be represented with a consistent anomaly score (e.g., an anomaly score computed in accordance with a Fresnel distance), whether the original orientation was at 0° or 60° (e.g., average incident angle over the surface). In other words, a Fresnel distance is computed using a Fresnel subtraction in accordance with embodiments of present disclosure, where the Fresnel distance between two polarization patterns is substantially independent of the original orientation of the surface (e.g., substantially independent of the average incident angle over the surface). In some embodiments of the present disclosure, a Fresnel subtraction function is parametrically learned using the pattern matching technique of symbolic regression. In some embodiments of the present disclosure, a Fresnel subtraction function is numerically approximated based on the known Fresnel equations in accordance with the refractive index of the material and the orientation of the surface, such as by dividing the measured reflected light by the percentage of energy reflected at the approximate incident angle of light on the surface (e.g., the average incident angle over a substantially planar local patch of the surface), based on an assumption that the variation of the surface normal is small enough to be within a substantially or sufficiently linear neighborhood of the curve. In some embodiments of the present disclosure, closed form equations are derived based on prior knowledge of the material properties, such as the refractive index of the material.

Because the Fresnel equations are refractive index dependent, Fresnel Subtraction is also dependent on the refractive index of the material (e.g., the shapes of the curves shown in FIG. 4 shift in accordance with the refractive index). Manufactured parts may have different refractive indexes in different patches (e.g., on different surfaces). In some embodiments of the present disclosure, a standard refractive index is selected based on balancing the sensitivity needs with respect to different surfaces of the object in accordance with the application (e.g., the contact surfaces of manufactured parts may be more important than non-contact surfaces of those manufactured parts, and therefore a refractive index closer to that of the contact surfaces may be selected). For example, the standard refractive index may be set to 1.5 and assumed to be sufficiently close.

In some embodiments of the present disclosure, local calibration with the design surface normals is performed to determine a locally smooth refractive index for each patch, thereby enabling a higher precision Fresnel Subtraction that is tailored for each patch. In some embodiments, local calibration is performed by assuming that the refractive index is a scalar constant that does not vary across different pixels and using information from different pixels to estimate the value of the refractive index for a given material. In some embodiments, local calibration is performed by estimating refractive index values using the techniques described in the "refractive distortion" section of Kadambi, Achuta, et al. "Polarized 3d: High-quality depth sensing with polarization cues." Proceedings of the IEEE International Conference on Computer Vision. 2015.

As such, some aspects of embodiments of the present disclosure relate to detecting defects by comparing measured feature maps or tensors extracted from polarization raw frames captured of an object under inspection against reference tensors or reference feature maps or template feature maps corresponding to reference or template objects (e.g., based on ideal surfaces from the design, such as a CAD model, or based on measurements of a known good object).

Surface Feature Detection Using Anomaly Detection Algorithms

In some embodiments of the present disclosure, surface features are detected using anomaly detection. For example, in some circumstances, some significant variation may be expected from one instance of an object under inspection to the next. For example, manufacturing processes may cause irregular and non-uniform variations in the polarization patterns exhibited by materials. While these variations may be within manufacturing tolerances, these variations may not be aligned with particular physical locations relative to the object as a whole. For example, glass window may exhibit some inconsistent polarization patterns from one window to the next, in accordance with the cooling process of the particular sheet of glass. However, the inconsistency in the polarization patterns may make it difficult to detect defects. For example, if a "reference" glass window is used to generate a template polarization pattern, differences between this template polarization pattern and a measured polarization pattern from another glass window may cause the detection of defects if the threshold is set too low, but if the threshold is set higher, then defects may go undetected. Some embodiments use an adaptive threshold and/or a threshold that is set based on physics-based priors. For example, if the surface is curved, then regions with high curvature are more likely to have stronger polarization signals. Therefore, in some embodiments, the threshold for this region is set differently than for a region that is estimated or expected to be flat. This adaptive thresholding can be very large (e.g., the threshold may differ by orders of magnitude between different surfaces), as the polarization strength can vary by two orders of magnitude between surfaces which appear mostly flat versus curved.

Accordingly, some aspects of embodiments of the present disclosure relate to an anomaly detection approach to detecting surface features in objects. For example, in some embodiments of the present disclosure, tensors in representation space are extracted from a large collection of known good reference samples. These reference tensors in representation space may differ from one another in accordance with natural variation (e.g., natural variations in their polarization patterns). Accordingly, one or more summary metrics can be computed on these reference tensors in representation space to cluster the various reference tensors, such as computing maxima and minima of DOLP, or characterizing the distribution of AOLP across different portions of the surface, or the smoothness of transitions in different levels of DOLP. The statistical distributions of these summary metrics of the set of known good objects may then be stored as a part of a stored model 810 for characterizing a surface.

In these embodiments of the present disclosure, based on this approach, the stored model 810 includes an anomaly detection model as a statistical model for commonly expected characteristics of a particular surface of the object that is loaded based on registration of the raw polarization frames 18 (or the computed tensors in representations spaces 50), similar summary metrics are computed from measurements are performed on the computed tensors 50 from the surface under inspection. If these summary metrics for the surface under inspection are within the distribution of metrics from the known good samples as represented in the anomaly detection model, then this particular portion of the surface may be marked as being clean or defect free. On the other hand, if one or more of these measurements is outside of the distribution of measurements (e.g., more than a threshold distance away from the distribution of known good samples, such as more than two standard deviations away from the mean) then the surface may be marked as containing a defect.

Surface Characteristic Detection Using Trained Convolutional Neural Networks

In some embodiments of the present disclosure, the stored models 810 include trained convolutional neural networks (CNNs) that are trained to detect one or more defects in the surfaces of the objects based on the supplied tensors in representation spaces. These CNNs may be trained based on labeled training data (e.g., data in which training tensors in the representation spaces are used to train the weights of connections it the neural network to compute outputs that label defective portions in accordance with labeled training data).

In some embodiments of the present disclosure, the models are implemented using one or more of: encoder-decoder neural networks, or U-net architectures for semantic segmentation of defects. A U-net enables multiscale information to be propagated. In some embodiments of the present disclosure, a CNN architecture for semantic segmentation and/or instance segmentation is trained using polarization training data (e.g., training data including polarization raw frames as training input and segmentation masks as labeled training output).

One embodiment of the present disclosure using deep instance segmentation is based on a modification of a Mask Region-based Convolutional Neural Network (Mask R-CNN) architecture to form a Polarized Mask R-CNN architecture. Mask R-CNN works by taking an input image x, which is an H×W×3 tensor of image intensity values (e.g., height by width by color intensity in red, green, and blue channels), and running it through a backbone network: $C=B(x)$. The backbone network $B(x)$ is responsible for extracting useful learned features from the input image and can be any standard CNN architecture such as AlexNet (see, e.g., Krizhevsky, Alex, Ilya Sutskever, and Geoffrey E. Hinton. "ImageNet classification with deep convolutional neural networks." Advances in neural information processing systems. 2012.), VGG (see, e.g., Simonyan, Karen, and Andrew Zisserman. "Very deep convolutional networks for large-scale image recognition." arXiv preprint arXiv: 1409.1556 (2014).), ResNet-101 (see, e.g., Kaiming He, Xiangyu Zhang, Shaoqing Ren, and Jian Sun. Deep residual learning for image recognition. In Proceedings of the IEEE Conference on Computer Vision and Pattern Recognition, pages 770-778, 2016.), MobileNet (see, e.g., Howard, Andrew G., et al. "Mobilenets: Efficient convolutional neural networks for mobile vision applications." arXiv preprint arXiv:1704.04861 (2017).), MobileNetV2 (see, e.g., Sandler, Mark, et al. "MobileNetV2: Inverted residuals and linear bottlenecks." Proceedings of the IEEE Conference on Computer Vision and Pattern Recognition. 2018.), and MobileNetV3 (see, e.g., Howard, Andrew, et al. "Searching for MobileNetV3." Proceedings of the IEEE International Conference on Computer Vision. 2019.)

The backbone network $B(x)$ outputs a set of tensors, e.g., $C=\{C_1, C_2, C_3, C_4, C_5\}$, where each tensor $C_i$ represents a different resolution feature map. These feature maps are then combined in a feature pyramid network (FPN) (see, e.g., Tsung-Yi Lin, Piotr Doll'ar, Ross Girshick, Kaiming He, Bharath Hariharan, and Serge Belongie. Feature pyramid networks for object detection. In Proceedings of the IEEE Conference on Computer Vision and Pattern Recognition, pages 2117-2125, 2017.), processed with a region proposal network (RPN) (see, e.g., Shaoqing Ren, Kaiming He, Ross Girshick, and Jian Sun. Faster r-cnn: Towards real-time object detection with region proposal networks. In Advances in Neural Information Processing Systems, pages 91-99, 2015.), and finally passed through an output subnetwork (see, e.g., Ren et al. and He et al., above) to produce classes, bounding boxes, and pixel-wise segmentations. These are merged with non-maximum suppression for instance segmentation.

In some embodiments, a Mask R-CNN architecture is used as a component of a Polarized Mask R-CNN architecture that is configured to take several input tensors, including tensors in polarization representation spaces, and to compute multi-scale second tensors in second representation spaces. In some embodiments, the tensors in the different first representation spaces are referred to as being in different "modes," and the tensors of each mode may be supplied to a separate Mask R-CNN backbone for each mode. Each of these backbones computes mode tensors at multiple scales or resolutions (e.g., corresponding to different scaled versions of the input first tensors), and the mode tensors computed at each scale for the different modes are fused to generate a fused tensor for each of the scales. The fused tensors or second tensors may then be supplied to a prediction module, which is trained to compute a prediction (e.g., identification of surface characteristics) based on the fused tensors or second tensors. A Polarized Mask R-CNN architecture is described in more detail in U.S. Provisional Patent Application No. 63/001,445, filed in the United States Patent and Trademark Office on Mar. 29, 2020 and in International Patent Application No. PCT/US20/48604, filed in the United States Patent and Trademark Office on Aug. 28, 2020, the entire disclosures of which are incorporated by reference herein.

While some embodiments of the present disclosure relate to surface characterization using a Polarized CNN architecture that includes a Mask R-CNN backbone, embodiments of the present disclosure are not limited thereto, and other backbones such as AlexNet, VGG, MobileNet, MobileNetV2, MobileNetV3, and the like may be modified in a similar manner in place of one or more (e.g., in place of all) of the Mask R-CNN backbones.

Accordingly, in some embodiments of the present disclosure, surface characterization results 20 are computed by supplying the first tensors, including tensors in polarization feature representation spaces, to a trained convolutional neural network (CNN), such as a Polarized Mask R-CNN architecture, to compute a segmentation map, where the segmentation map identifies locations or portions of the input images (e.g., the input polarization raw frames) that correspond to particular surface characteristics (e.g., surface defects such as cracks, dents, uneven paint, the presence of surface contaminants, and the like or surface features such as surface smoothness versus roughness, surface flatness versus curvature, and the like).

Surface Characteristic Detection Using Classifiers

In some embodiments of the present disclosure, rather than use a convolutional neural network to identify regions of the surface under inspection that contain various surface characteristics of interest (e.g., that contain defects), the model 810 includes a trained classifier that classifies the given input into one or more categories. For example, a trained classifier may compute a characterization output 20 that includes a vector having a length equal to the number of different possible surface characteristics that the classifier is trained to detect, where each value in the vector corresponds to a confidence that the input image depicts the corresponding surface characteristic.

A classifier may be trained to take input images of a fixed size, where the inputs may be computed by, for example, extracting first tensors in first representation spaces from the raw polarization frames and supplying the entire first tensors as input to the classifier or dividing the first tensors into fixed size blocks. In various embodiments of the present disclosure, the classifier may include, for example, a support vector machine, a deep neural network (e.g., a deep fully connected neural network), and the like.

Training Data for Training Statistical Models

Some aspects of embodiments of the present disclosure relate to preparing training data for training statistical models for detecting surface features. In some circumstances, manually labeled (e.g., human labeled) training data may be available, such as in the form of manually capturing polarization raw frames of the surface of an object using a polarization camera and labeling regions of the images as containing surface characteristics of interest (e.g., borders between different types of materials, locations of defects such as dents and cracks, or surface irregularities such as rough portions of a surface that is expected to be smooth). These manually labeled training data may be used as part of a training set for training a statistical model such as an anomaly detector or a convolutional neural network as described above.

While manually labeled training data is generally considered to be good training data, there may be circumstances in which this manually labeled data may be insufficiently large to train a good statistical model. As such, some aspects of embodiments of the present disclosure further relate to augmenting a training data set, which may include synthesizing additional training data.

In some embodiments of the present disclosure, computer graphics techniques are used to synthesize training object data with and without the surface characteristics of interest. For example, when training a detector to detect surface defects, polarization raw frames of defect-free surfaces may be combined with polarization raw frames depicting defects such as cracks, chips, burrs, uneven paint, and the like. These separate images may be combined using computer graphics techniques (e.g., image editing tools to programmatically clone or composite the polarization raw frame images of the defects onto the polarization raw frames of defect-free surfaces to simulate or synthesize polarization raw frames of surfaces containing defects). The composited defects may be placed on physically reasonable locations of the clean surfaces (e.g., an image of a dent in a door panel is composited into images of portions of door panels that can be dented and not placed in physically unrealistic areas such as on glass windows, likewise, a chip in a glass surface may be composited into glass surfaces but not onto images of plastic trim).

As another example, in some embodiments of the present disclosure, a generative adversarial network (GAN) is trained to generate synthesized data, where a generative network is trained to synthesize polarization raw frames of surfaces depicting defects and a judging network is trained to determine whether its inputs are genuine polarization raw frames or synthesized (e.g., by the generative network).

In some embodiments of the present disclosure, a technique known as "domain randomization" is used to add "random" image-based perturbations to the simulated or synthesized training data to make the synthesized training data more closely resemble real-world data. For example, in some embodiments of the present disclosure, rotation augmentation is applied to the training data to augment the training data with rotated versions of the various features. This may be particularly beneficial to the accuracy of detection of defects that have extreme aspect ratios (e.g., scratches) that are not well-represented in natural images.

In various embodiments of the present disclosure, a statistical model is trained using the training data based on corresponding techniques. For example, in embodiments using an anomaly detection approach, various statistics are computed on the sets of good data, such as the mean and the variance of the good data points to determine threshold distances (e.g., two standard deviations) for determining whether a given sample is acceptable or is anomalous (e.g., defective). In embodiments using a neural network such as a convolutional neural network (e.g., a Polarization Mask R-CNN), the training process may include updating the weights of connections between neurons of various layers of the neural network in accordance with a backpropagation algorithm and the use of gradient descent to iteratively adjust the weights to minimize an error (or loss) between the output of the neural network and the labeled training data.

As such, aspects of embodiments of the present disclosure provide systems and methods for automatic characterization of surfaces, such as for the automated inspection of manufactured parts as they roll off the assembly line. These automation processes enable cost savings for manufacturers, not only through automation and consequent reduction of manual labor in inspection, but also through robust and accurate handling of anomalies in the products themselves (e.g., automatically removing defective products from a manufacturing stream).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A computer-implemented method for surface modeling, the method comprising:
    receiving one or more polarization raw frames of a surface of a physical object, the polarization raw frames being captured at different polarizations by a polarization camera comprising a polarizing filter;
    extracting one or more first tensors in one or more polarization representation spaces from the polarization raw frames, wherein the one or more first tensors in the one or more polarization representation spaces comprise:
        a degree of linear polarization (DOLP) image in a DOLP representation space; and
        an angle of linear polarization (AOLP) image in an AOLP representation space; and
    detecting a surface characteristic of the surface of the physical object based on the one or more first tensors in the one or more polarization representation spaces, the surface characteristic being low contrast or invisible in an intensity representation space.

2. The computer-implemented method of claim 1, wherein the one or more first tensors further comprise one or more non-polarization tensors in one or more non-polarization representation spaces, and
    wherein the one or more non-polarization tensors comprise one or more intensity images in intensity representation space.

3. The computer-implemented method of claim 2, wherein the one or more intensity images comprise:
    a first color intensity image;
    a second color intensity image; and
    a third color intensity image.

4. The computer-implemented method of claim 1, wherein the surface characteristic comprises a detection of a defect in the surface of the physical object.

5. The computer-implemented method of claim 4, wherein the detecting the surface characteristic comprises:
    loading a stored model corresponding to a location of the surface of the physical object; and
    computing the surface characteristic in accordance with the stored model and the one or more first tensors in the one or more polarization representation spaces.

6. The computer-implemented method of claim 5, wherein the stored model comprises one or more reference tensors in the one or more polarization representation spaces, and
    wherein the computing the surface characteristic comprises computing a difference between the one or more reference tensors and the one or more first tensors in the one or more polarization representation spaces.

7. The computer-implemented method of claim 6, wherein the difference is computed using a Fresnel distance.

8. The computer-implemented method of claim 5, wherein the stored model comprises a reference three-dimensional mesh, and
    wherein the computing the surface characteristic comprises:
        computing a three-dimensional point cloud of the surface of the physical object based on the one or more first tensors in the one or more polarization representation spaces; and
        computing a difference between the three-dimensional point cloud and the reference three-dimensional mesh.

9. The computer-implemented method of claim 5, wherein the stored model comprises a trained statistical model configured to compute a prediction of the surface characteristic based on the one or more first tensors in the one or more polarization representation spaces.

10. The computer-implemented method of claim 9, wherein the trained statistical model comprises an anomaly detection model.

11. The computer-implemented method of claim 9, wherein the trained statistical model comprises a convolutional neural network trained to detect defects in the surface of the physical object.

12. The computer-implemented method of claim 9, wherein the trained statistical model comprises a trained classifier trained to detect defects.

13. A system for surface modeling, the system comprising:
    a polarization camera comprising a polarizing filter, the polarization camera being configured to capture polarization raw frames at different polarizations; and
    a processing system comprising a processor and memory storing instructions that, when executed by the processor, cause the processor to:
        receive one or more polarization raw frames of a surface of a physical object, the polarization raw frames corresponding to different polarizations of light;
        extract one or more first tensors in one or more polarization representation spaces from the polarization raw frames, wherein the one or more first tensors in the one or more polarization representation spaces comprise:
            a degree of linear polarization (DOLP) image in a DOLP representation space; and
            an angle of linear polarization (AOLP) image in an AOLP representation space; and
        detect a surface characteristic of the surface of the physical object based on the one or more first tensors in the one or more polarization representation spaces, the surface characteristic being low contrast or invisible in an intensity representation space.

14. The system claim 13, wherein the one or more first tensors further comprise one or more non-polarization tensors in one or more non-polarization representation spaces, and
    wherein the one or more non-polarization tensors comprise one or more intensity images in intensity representation space.

15. The system of claim 14, wherein the one or more intensity images comprise:
    a first color intensity image;
    a second color intensity image; and
    a third color intensity image.

16. The system of claim 13, wherein the surface characteristic comprises a defect in the surface of the physical object.

17. The system of claim 16, wherein the memory further stores instructions that, when executed by the processor, cause the processor to detect the surface characteristic by:
loading a stored model corresponding to a location of the surface of the physical object; and
computing the surface characteristic in accordance with the stored model and the one or more first tensors in the one or more polarization representation spaces.

18. The system of claim 17, wherein the stored model comprises one or more reference tensors in the one or more polarization representation spaces, and
wherein the memory further stores instructions that, when executed by the processor, cause the processor to compute the surface characteristic by computing a difference between the one or more reference tensors and the one or more first tensors in the one or more polarization representation spaces.

19. The system of claim 18, wherein the difference is computed using a Fresnel distance.

20. The system of claim 17, wherein the stored model comprises a trained statistical model configured to compute a prediction of the surface characteristic based on the one or more first tensors in the one or more polarization representation spaces.

21. The system of claim 20, wherein the trained statistical model comprises an anomaly detection model.

22. The system of claim 20, wherein the trained statistical model comprises a convolutional neural network trained to detect defects in the surface of the physical object.

23. The system of claim 20, wherein the trained statistical model comprises a trained classifier trained to detect defects.

24. A system for surface modeling, the system comprising:
a polarization camera comprising a polarizing filter, the polarization camera being configured to capture polarization raw frames at different polarizations; and
a processing system comprising a processor and memory storing instructions that, when executed by the processor, cause the processor to:
receive one or more polarization raw frames of a surface of a physical object, the polarization raw frames corresponding to different polarizations of light;
extract one or more first tensors in one or more polarization representation spaces from the polarization raw frames; and
detect a surface characteristic of the surface of the physical object based on the one or more first tensors in the one or more polarization representation spaces,
wherein the surface characteristic comprises a defect in the surface of the physical object,
wherein the memory further stores instructions that, when executed by the processor, cause the processor to detect the surface characteristic by:
loading a stored model corresponding to a location of the surface of the physical object; and
computing the surface characteristic in accordance with the stored model and the one or more first tensors in the one or more polarization representation spaces
wherein the stored model comprises a reference three-dimensional mesh, and
wherein the memory further stores instructions that, when executed by the processor, cause the processor to compute the surface characteristic by:
computing a three-dimensional point cloud of the surface of the physical object based on the one or more first tensors in the one or more polarization representation spaces; and
computing a difference between the three-dimensional point cloud and the reference three-dimensional mesh.

* * * * *